(12) United States Patent
Cozzi et al.

(10) Patent No.: US 12,473,234 B2
(45) Date of Patent: *Nov. 18, 2025

(54) VISUAL COMMUNICATIONS

(71) Applicant: Sococo, Inc., Austin, TX (US)

(72) Inventors: Eric Cozzi, Hayward, CA (US); David Van Wie, Eugene, OR (US); Paul J. Brody, Palo Alto, CA (US); Matthew Leacock, Sunnyvale, CA (US)

(73) Assignee: Sococo, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,141

(22) Filed: Jun. 20, 2023

(65) Prior Publication Data

US 2023/0339816 A1     Oct. 26, 2023

Related U.S. Application Data

(63) Continuation of application No. 17/242,605, filed on Apr. 28, 2021, now Pat. No. 11,785,056, which is a
(Continued)

(51) Int. Cl.
| | |
|---|---|
| C04B 35/119 | (2006.01) |
| C04B 35/03 | (2006.01) |
| C04B 37/02 | (2006.01) |
| H01L 23/15 | (2006.01) |
| H04L 65/1069 | (2022.01) |
| H04L 65/1104 | (2022.01) |

(Continued)

(52) U.S. Cl.
CPC ............ *C04B 35/119* (2013.01); *C04B 35/03* (2013.01); *C04B 37/021* (2013.01); *C04B 37/025* (2013.01); *H01L 23/15* (2013.01); *H04L 65/1069* (2013.01); *H04L 65/1104* (2022.05); *H04L 65/65* (2022.05); *H04L 67/131* (2022.05); *H04L 67/52* (2022.05); *H04L 67/54* (2022.05); *H04W 4/021* (2013.01); *C04B 2235/3222* (2013.01); *C04B 2235/5436* (2013.01)

(58) Field of Classification Search
CPC ..... C04B 35/119; C04B 35/03; C04B 37/021; C04B 37/025; H04L 65/1069; H04L 65/1104; H04L 65/65; H04L 67/54; H04L 67/131; H04L 67/52; H04L 23/15; H04W 4/021
USPC .......................................................... 709/231
See application file for complete search history.

(56) References Cited

U.S. PATENT DOCUMENTS

| | | | |
|---|---|---|---|
| 6,559,863 B1 * | 5/2003 | Megiddo ................. | H04N 7/15 348/E7.083 |
| 2004/0233234 A1 * | 11/2004 | Chaudhry ............... | H04L 41/22 715/735 |

(Continued)

OTHER PUBLICATIONS

Request for Continued Examination dated May 10, 2023, filed in U.S. Appl. No. 17/242,605, pp. 1-5.
(Continued)

*Primary Examiner* — Faisal Choudhury

(57) ABSTRACT

A web browser interface for visualizing realtime network communications in spatial communication environments allows communicants to interact with other communicants in an immersive spatial communication environment without having to install any specialized communication software and without requiring special proxies or firewall additions or exceptions.

17 Claims, 10 Drawing Sheets

Related U.S. Application Data continuation of application No. 16/120,026, filed on Aug. 31, 2018, now Pat. No. 11,025,679, which is a continuation of application No. 15/168,481, filed on May 31, 2016, now Pat. No. 10,069,873, which is a continuation of application No. 13/165,729, filed on Jun. 21, 2011, now Pat. No. 9,357,025, which is a continuation-in-part of application No. 12/694,126, filed on Jan. 26, 2010, now Pat. No. 9,009,603.

(51) Int. Cl.
| | | |
|---|---|---|
| *H04L 65/65* | (2022.01) | |
| *H04L 67/131* | (2022.01) | |
| *H04L 67/52* | (2022.01) | |
| *H04L 67/54* | (2022.01) | |
| *H04W 4/021* | (2018.01) | |

(56) References Cited

U.S. PATENT DOCUMENTS

2009/0113053 A1\* 4/2009 Van Wie ............. H04L 12/1827
709/227
2009/0254842 A1\* 10/2009 Leacock ............. G06F 3/04815
715/757

OTHER PUBLICATIONS

Notice of Allowance mailed Feb. 10, 2023, filed in U.S. Appl. No. 17/242,605, pp. 1-18.
Terminal Disclaimer Filed Dec. 27, 2022, filed in U.S. Appl. No. 17/242,605, pp. 1-3.
Terminal Disclaimer Approved Dec. 27, 2022, filed in U.S. Appl. No. 17/242,605, p. 1.
Non-Final Office Action mailed Jul. 26, 2022, filed in U.S. Appl. No. 17/242,605, pp. 1-9.

\* cited by examiner

VISUAL COMMUNICATIONS

CROSS-REFERENCE TO RELATED APPLICATIONS

This application relates to the following co-pending patent applications, the entirety of each of which is incorporated herein by reference: U.S. patent application Ser. No. 12/509,658, filed Jul. 27, 2009; U.S. patent application Ser. No. 12/418,270, filed Apr. 3, 2009; U.S. patent application Ser. No. 12/354,709, filed Jan. 15, 2009; U.S. application Ser. No. 12/630,973, filed on Dec. 4, 2009; U.S. patent application Ser. No. 11/923,629, filed Oct. 24, 2007; and U.S. patent application Ser. No. 11/923,634, filed Oct. 24, 2007.

BACKGROUND

When face-to-face communications are not practical, people often rely on one or more technological solutions to meet their communications needs. These solutions typically are designed to simulate one or more aspects of face-to-face communications. Traditional telephony systems enable voice communications between callers. Instant messaging (also referred to as "chat") communications systems enable users to communicate text messages in real time through instant message computer clients that are interconnected by an instant message server. Some instant messaging systems additionally allow users to be represented in a virtual environment by user-controllable graphical objects (referred to as "avatars"). Interactive virtual reality communication systems enable users in remote locations to communicate over multiple real-time channels and to interact with each other by manipulating their respective avatars in three-dimensional virtual spaces. What are needed are improved interfaces for realtime network communications.

DETAILED DESCRIPTION

Figure 1:
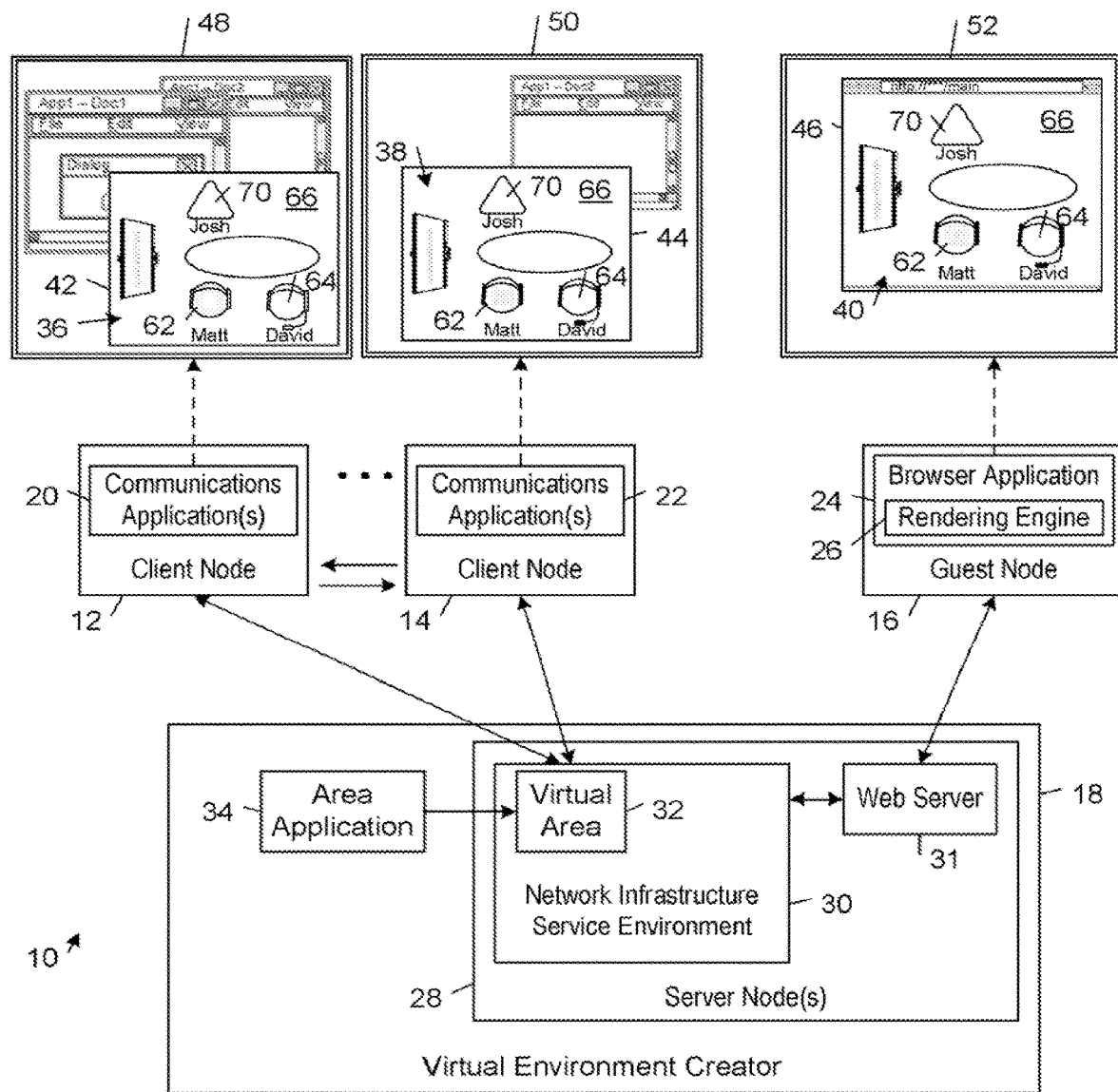
FIG. 1 is a block diagram of an embodiment of a network communications environment that includes a first client network node, a second client network node, a guest network node 16, and a virtual environment creator.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes. A "guest communicant" is a communicant who interfaces with a spatial communication environment through a web browser application.

A "realtime contact" of a user is a communicant or other person who has communicated with the user via a realtime communications platform.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "computer data file" is a block of information that durably stores data for use by a software application.

A "web browser" is a software application that displays web pages on a display. A "web page" typically is formatted in the hypertext markup language (HTML), which specifies the arrangement and format of various types of web page elements, including text, images, and multimedia files.

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

A "database" is an organized collection of records that are presented in a standardized format that can be searched by computers. A database may be stored on a single computer-readable data storage medium on a single computer or it may be distributed across multiple computer-readable data storage media on one or more computers.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Exemplary network nodes include, but are not limited to, a terminal, a computer, and a network switch. A "server" network node is a host computer on a network that responds to requests for information or service. A "client network node" is a computer on a network that requests information or service from a server. A "guest network node" is a client network node being operated by a guest communicant who interfaces with a spatial communication environment through a web browser application.

A "network connection" is a link between two communicating network nodes. A "connection handle" is a pointer or identifier (e.g., a uniform resource identifier (URI)) that can be used to establish a network connection with a communicant, resource, or service on a network node. A "network communication" can include any type of information (e.g., text, voice, audio, video, electronic mail message, data file, motion data stream, and data packet) that is transmitted or otherwise conveyed from one network node to another network node over a network connection.

Synchronous conferencing refers to communications in which communicants participate at the same time. Synchronous conferencing encompasses all types of networked collaboration technologies, including instant messaging (e.g., text chat), audio conferencing, video conferencing, application sharing, and file sharing technologies.

A "communicant interaction" is any type of direct or indirect action or influence between a communicant and another network entity, which may include for example another communicant, a virtual area, or a network service. Exemplary types of communicant communications include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), and file transfers.

A "link" is a connection between two network nodes and represents the full bandwidth allocated by the two nodes for real-time communication. Each link is divided into channels that carry respective real-time data streams. Channels are allocated to particular streams within the overall bandwidth that has been allocated to the link.

A "virtual area" (also referred to as an "area" or a "place") is a representation of a computer-managed space or scene. Virtual areas typically are one-dimensional, two-dimensional, or three-dimensional representations; although in some embodiments a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual area communications application" is a client communications application that integrates realtime audio communications (and potentially other realtime communications, e.g., video, chat, and realtime other data stream) with visual presentations of interactions in a virtual area.

A "virtual environment" is a representation of a computer-managed space that includes at least one virtual area and supports realtime communications between communicants.

A "zone" is a region of a virtual area that is associated with at least one switching rule or governance rule. A "switching rule" is an instruction that specifies a connection or disconnection of one or more realtime data sources and one or more realtime data sinks subject to one or more conditions precedent. A switching rule controls switching (e.g., routing, connecting, and disconnecting) of realtime data streams between network nodes communicating in the context of a virtual area. A governance rule controls a communicant's access to a resource (e.g., an area, a region of an area, or the contents of that area or region), the scope of that access, and follow-on consequences of that access (e.g., a requirement that audit records relating to that access must be recorded). A "renderable zone" is a zone that is associated with a respective visualization.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "spatial state" is an attribute that describes where a user has presence in a virtual area. The spatial state attribute typically has a respective value (e.g., a zone_ID value) for each of the zones in which the user has presence.

A "communication state" is an attribute that describes a state of a respective communication channel over which a respective one of the communicants is configured to communicate.

In the context of a virtual area, an "object" (also sometimes referred to as a "prop") is any type of discrete element in a virtual area that may be usefully treated separately from the geometry of the virtual area. Exemplary objects include doors, portals, windows, view screens, and speakerphone. An object typically has attributes or properties that are separate and distinct from the attributes and properties of the virtual area. An "avatar" (also referred to herein as a "sprite") is an object that represents a communicant in a virtual area.

As used herein, the term "includes" means includes but not limited to, the term "including" means including but not limited to. The term "based on" means based at least in part on.

II. INTRODUCTION

The embodiments that are described herein provide improved systems and methods for visualizing realtime network communications. In particular, these embodiments provide a web browser interface for spatial communication environments.

This feature allows communicants to interact with other communicants in an immersive spatial communication environment without having to install any specialized communication software and without requiring special proxies or firewall additions or exceptions.

FIG. 1 shows an embodiment of an exemplary network communications environment 10 that includes a first client network node 12, a second client network node 14, a guest network node 16, and a virtual environment creator 18 that are interconnected by a network (not shown). Each of the first client network node 12 and the second client network node 14 includes input/output (I/O) hardware, a processor, and a computer-readable memory that stores a respective instance 20, 22 of at least one virtual-area-enabled communications application that is executable by the processor. The guest network node 16 includes input/output (I/O) hardware, a processor, and a computer-readable memory that stores an instance of a web browser application 24 that includes a rendering engine 26. The virtual environment creator 18 includes at least one server network node 28 that provides a network infrastructure service environment 30. The virtual-area-enabled communications applications 20, 22 and the network infrastructure service environment 30 together provide a platform (referred to herein as "the platform") for creating a spatial communication environment (also referred to herein simply as a "virtual environment"). The virtual environment creator 18 also includes a web server 31 that communicates with the web browser application 24 running on the guest network node 16 to extend the spatial communication environment to a guest communicant operating the guest network node 16.

As explained in detail below, the virtual-area-enabled communications applications 20, 22 are specialized communications applications that communicate with the network infrastructure service environment 30 in accordance with a native format and a communications protocol that facilitates realtime communications performance. An exemplary embodiment of the virtual-area-enabled communication application is described in co-pending U.S. application Ser. No. 12/630,973, which was filed on Dec. 4, 2009, and the entirety of which is incorporated herein by reference. The virtual-area-enabled communications applications 20, 22 also enable the client communicants operating the client nodes 12, 14 to establish realtime peer-to-peer communications with one another. The web browser application 24, on the other hand, has limited functionality. In some embodiments, the web browser application 24 interprets HTML code (e.g., text, images, hypertext links, JavaScript, and Java applets) and renders the HTML code to produce a presentation of the web page on the display. The web browser application 24 typically communicates with the web server 31 in accordance with HTTP. In a typical communication session, the web browser application 24 acts as a client that sends HTTP requests (also referred to herein as "messages") to the web server 31 to open a file (e.g., a web page or other file that is accessible by a uniform resource locator (URL)), and an HTTP daemon or other computer software running on the web server 31 processes the HTTP requests and returns the requested file to the web browser application 24.

In some embodiments, the network infrastructure service environment 30 manages communications sessions between communicants operating the first and second client nodes 12, 14 and the guest network node 16 in a virtual area 32 in accordance with a virtual area application 34. The virtual area application 34 is hosted by the virtual area 32 and includes a description of the virtual area 32. The virtual-area-enabled communications applications 20, 22 operating on the first and second client network nodes 12, 14 and the web browser application 24 operating on the guest network node 16 present respective views 36, 38, 40 of the virtual area 32 in accordance with data received from the network infrastructure service environment 30 and provide respective interfaces for receiving commands from the client communicants operating the client nodes 12, 14 and the guest network node 16. The views 36, 38 on the client nodes 12, 14 are presented in respective windows 42, 44 that are generated by the virtual-area-enabled communications applications 20, 22. The view 40 on the guest network node 16 is presented in a respective browser window 46 that is generated by the web browser application 24. The communication application windows 42, 44 and the browser window 46 typically are displayed on respective "desktops" or other system-defined base windows 48, 50, 52 on the display hardware of the client nodes 12, 14 and the guest network node 16.

The rendering engine 26 may be any type of program code (e.g., browser script, plugin, or applet) that can be executed by the web browser application 24 for rendering a specification of a visualization of a realtime communication session that is received from the web server 31 into a format that can be rendered by the web browser application 24. In some embodiments, the rendering engine 26 is embodied in JavaScript code that is downloaded to the guest network node 16 "on the fly" each time the guest user enters to virtual area. The JavaScript code contains all the logic for rendering an interface specification received from the virtual environment creator 18 into HTML that is rendered by the web browser application 24 to create a user interface that matches the look and feel of the user interfaces created by the virtual-area-enabled communications applications 20, 22.

The communicants typically are represented in the virtual area 32 by respective avatars 62, 64, 70, which move about the virtual area 32 in response to commands that are input by the communicants at their respective network nodes 12-16. In some embodiments, each communicant's view of the virtual area 32 is presented from the perspective of the communicant's avatar, which increases the level of immersion experienced by the communicant. Each communicant typically is able to view any part of the virtual area 32 around his or her avatar. In some embodiments, the virtual environment creator 18 establishes realtime data stream connections between the network nodes 12, 14, 16 and other network nodes sharing the virtual area 32 based on the respective positions of the communicants' avatars in the virtual area 32.

III. MANAGING COMMUNICATIONS SESSIONS

A. Introduction

Figure 2:
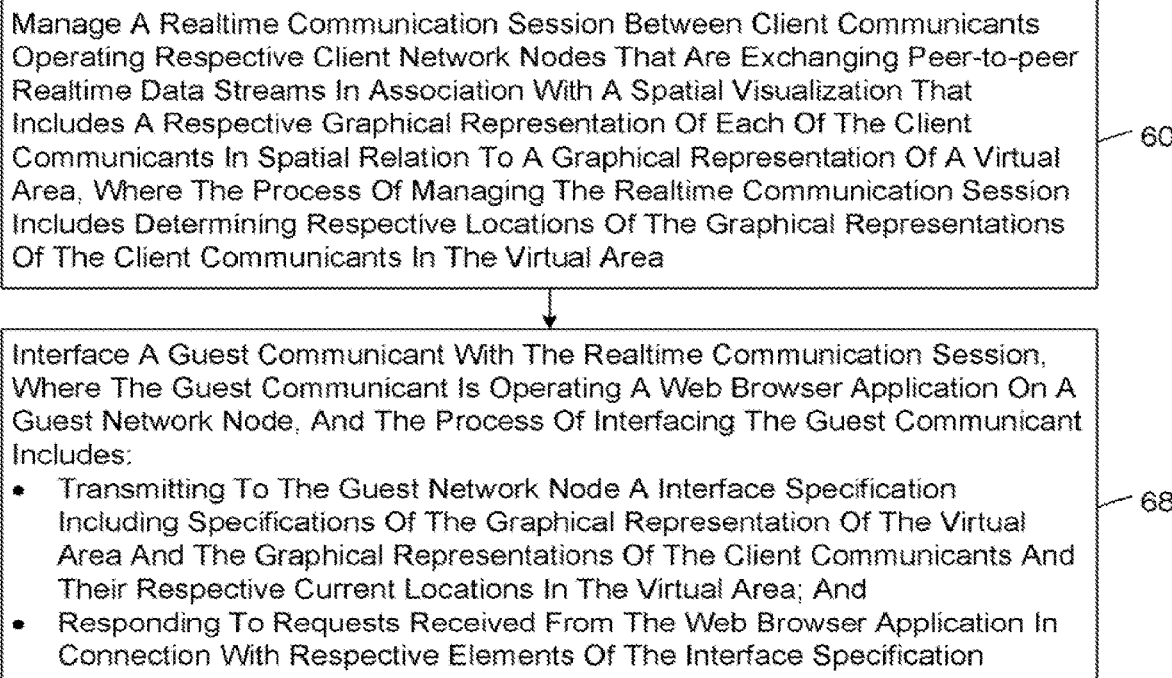
FIG. 2 is a flow diagram of an embodiment of a method that is implemented by an embodiment of the virtual environment creator of FIG. 1.

FIG. 2 shows an embodiment of a method that is implemented by an embodiment of the virtual environment creator 18.

In accordance with the method of FIG. 2, the virtual environment creator 18 manages a realtime communication session between client communicants operating the client network nodes 20, 22, which are exchanging peer-to-peer realtime data streams 54 in association with a spatial visualization of the communication session (FIG. 2, block 60). The spatial visualization includes a respective graphical representation 62, 64 of each of the client communicants in spatial relation to a graphical representation of a virtual area 66 (see FIG. 1). In the process of managing the communication session, the virtual environment creator 18 determines respective locations of the graphical representations 62 64 of the client communicants in the virtual area 66. The virtual environment creator 18 also interfaces the guest communicant with the realtime communication session, where the guest communicant is operating the web browser application 24 on the guest network node 16 (FIG. 2, block 68). In this process, the virtual environment creator 18 transmits to the guest network node 16 an interface specification that includes specifications of the graphical representation of the virtual area 32 and the graphical representations of the client communicants and their respective current locations in the virtual area 32. The virtual environment creator 18 also responds to requests that are received from the web browser application 24 in connection with respective elements of the interface specification. Exemplary requests include requests to navigate to selected locations in the virtual area 32, requests to interact with selected communicants represented by respective avatars in the virtual area 32, and requests communicate with other communicants via selected props in the virtual area 32.

B. Communications Between Client Network Nodes

1. Network Environment

The network over which the client and guest network nodes 12-16 communicate may include any of a local area network (LAN), a metropolitan area network (MAN), and a wide area network (WAN) (e.g., the internet). The network typically includes a number of different computing platforms and transport facilities that support the transmission of a wide variety of different media types (e.g., text, voice, audio, and video) between network nodes.

The virtual-area-enabled communications applications 20, 22 (see FIG. 1) typically operate on client network nodes that include software and hardware resources which, together with administrative policies, user preferences (including preferences regarding the exportation of the user's presence and the connection of the user to areas and other users), and other settings, define a local configuration that influences the administration of realtime connections with other network nodes. The network connections between network nodes may be arranged in a variety of different stream handling topologies, including a peer-to-peer architecture, a server-mediated architecture, and hybrid architectures that combine aspects of peer-to-peer and server-mediated architectures. Exemplary topologies of these types are described in U.S. application Ser. Nos. 11/923,629 and 11/923,634, both of which were filed on Oct. 24, 2007.

2. Network Infrastructure Services

The network infrastructure service environment 30 typically includes one or more network infrastructure services that cooperate with the virtual-area-enabled communications applications 20, 22 in the process of establishing and administering network connections between the client nodes 12, 14 and other network nodes (see FIG. 1). The network infrastructure services may run on a single network node or may be distributed across multiple network nodes. The network infrastructure services typically run on one or more dedicated network nodes (e.g., a server computer or a network device that performs one or more edge services, such as routing and switching). In some embodiments, however, one or more of the network infrastructure services run on at least one of the communicants' network nodes. Among the network infrastructure services that are included in the exemplary embodiment of the network infrastructure service environment 30 are an account service, a security service, an area service, a rendezvous service, and an interaction service.

Account Service

The account service manages communicant accounts for the virtual environment. The account service also manages the creation and issuance of authentication tokens that can be used by client network nodes to authenticate themselves to any of the network infrastructure services.

Security Service

The security service controls communicants' access to the assets and other resources of the virtual environment. The access control method implemented by the security service typically is based on one or more of capabilities (where access is granted to entities having proper capabilities or permissions) and an access control list (where access is granted to entities having identities that are on the list). After a particular communicant has been granted access to a resource, that communicant typically uses the functionality provided by the other network infrastructure services to interact in the network communications environment 10.

Area Service

The area service administers virtual areas. In some embodiments, the area service remotely configures the virtual-area-enabled communications applications 20, 22 operating on the first and second client network nodes 12, 14 in accordance with the virtual area application 34 subject to a set of constraints. The constraints typically include controls on access to the virtual area 32. The access controls typically are based on one or more of capabilities (where access is granted to communicants or client nodes having proper capabilities or permissions) and an access control list (where access is granted to communicants or client nodes having identities that are on the list).

The area service also manages network connections that are associated with the virtual area 32 subject to the capabilities of the requesting entities, maintains global state information for the virtual area, and serves as a data server for the client network nodes participating in a shared communication session in a context defined by the virtual area 32. The global state information includes a list of all the objects that are in the virtual area 32 and their respective locations in the virtual area. The area service sends instructions that configure the client network nodes. The area service also registers and transmits initialization information to other client network nodes that request to join the communication session. In this process, the area service may transmit to each joining client network node a list of components (e.g., plugins) that are needed to render the virtual area 32 on the client network node in accordance with the virtual area application 34. The area service also ensures that the client network nodes can synchronize to a global state if a communications fault occurs. The area service typically manages communicant interactions with virtual areas via governance rules that are associated with the virtual areas.

Rendezvous Service

The rendezvous service manages the collection, storage, and distribution of presence information and provides mechanisms for network nodes to communicate with one another (e.g., by managing the distribution of connection handles) subject to the capabilities of the requesting entities. The rendezvous service typically stores the presence information in a presence database. The rendezvous service typically manages communicant interactions with each other via communicant privacy preferences.

Interaction Service

The interaction service maintains a relationship database that contains the records of interactions between communicants. For every interaction between communicants, one or more services of the network infrastructure service environment 30 (e.g., the area service) transmit interaction data to the interaction service. In response, the interaction service generates one or more respective interaction records and stores them in the relationship database. Each interaction record describes the context of an interaction between a pair of communicants. For example, in some embodiments, an interaction record contains an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. Thus, for each realtime interaction, the interaction service tracks when it occurred, where it occurred, and what happened during the interaction in terms of communicants involved (e.g., entering and exiting), objects that are activated/deactivated, and the files that were shared.

The interaction service also supports queries on the relationship database subject to the capabilities of the requesting entities. The interaction service presents the results of queries on the interaction database records in a sorted order (e.g., most frequent or most recent) based on virtual area. The query results can be used to drive a frequency sort of contacts whom a communicant has met in which virtual areas, as well as sorts of who the communicant has met with regardless of virtual area and sorts of the virtual areas the communicant frequents most often. The query results also may be used by application developers as part of a heuristic system that automates certain tasks based on relationships. An example of a heuristic of this type is a heuristic that permits communicants who have visited a particular virtual area more than five times to enter without knocking by default, or a heuristic that allows communicants who were present in an area at a particular time to modify and delete files created by another communicant who was present in the same area at the same time. Queries on the relationship database can be combined with other searches. For example, queries on the relationship database may be combined with queries on contact history data generated for interactions with contacts using a communication system (e.g., Skype, Facebook, and Flickr) that is outside the domain of the network infrastructure service environment 30.

3. Virtual Areas

The virtual-area-enabled communications applications 20, 22 and the network infrastructure service environment 30 typically administer the realtime connections with network nodes in a communication context that is defined by an instance of a virtual area. The virtual area instance may correspond to an abstract (non-geometric) virtual space that is defined with respect to abstract coordinates.

Alternatively, the virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

As explained above, communicants typically are represented by respective avatars in a virtual area that has an associated visualization. The avatars move about the virtual area in response to commands that are input by the communicants at their respective network nodes. In some embodiments, the communicant's view of a virtual area instance typically is presented from the perspective of the communicant's avatar, and each communicant typically is able to view any part of the visual virtual area around his or her avatar, increasing the level of immersion that is experienced by the communicant.

The virtual area typically includes zones that are associated with respective rules that govern the switching of realtime data streams between the network nodes that are represented by the avatars in the virtual area. The switching rules dictate how local connection processes executing on each of the network nodes establishes communications with the other network nodes based on the locations of the communicants' avatars in the zones of the virtual area.

A virtual area is defined by a specification that includes a description of geometric elements of the virtual area and one or more rules, including switching rules and governance rules. The switching rules govern realtime stream connections between the network nodes. The governance rules control a communicant's access to resources, such as the virtual area itself, regions with the virtual area, and objects within the virtual area. In some embodiments, the geometric elements of the virtual area are described in accordance with the COLLADA—Digital Asset Schema Release 1.4.1 Apr. 2006 specification (available from http://www.khronos.org/colladal), and the switching rules are described using an extensible markup language (XML) text format (referred to herein as a virtual space description format (VSDL)) in accordance with the COLLADA Streams Reference specification described in U.S. application Ser. Nos. 11/923,629 and 11/923,634.

The geometric elements of the virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the client nodes or only to respective connections with individual client nodes. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. application Ser. Nos. 11/923,629 and 11/923,634. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one or more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the documents, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. application Ser. No. 12/418,243 (which was filed on Apr. 3, 2009), Ser. No. 11/923,629 (which was filed on Oct. 24, 2007), and Ser. No. 11/923,634 (which was filed on Oct. 24, 2007).

The spatial communication environment typically can be modeled as a spatial hierarchy of places (also referred to herein as "locations") and objects. The spatial hierarchy includes an ordered sequence of levels ranging from a top level to a bottom level. Each of the places in a successive one of the levels of the spatial hierarchy is contained in a respective one of the places in a preceding one of the levels. Each of the objects in the spatial hierarchy is contained in a respective one of the places. The levels of the spatial hierarchy typically are associated with respective visualizations that are consistent with a geographical, architectural, or urban metaphor, and are labeled accordingly. The zones of each virtual area are defined by respective meshes, some of which define elements of a physical environment (e.g., spaces, such as rooms and courtyards, that are associated with a building) that may contain objects (e.g., avatars and props, such as view screen objects, table objects, and conferencing objects).

4. Virtual-Area-Enabled Communications Application Resources

In some embodiments, each of the virtual-area-enabled communications applications 20, 22 includes interfaces for the following resources:
 a) local Human Interface Devices (HIDs) and audio playback devices;
 b) a So3D graphical display, avatar, and physics engine;
 c) a system database and storage facility.

a. Local Human Interface Devices (HIDs) and Audio Playback Devices

The local HIDs enable a communicant to input commands and other signals into the client network node while participating in a virtual area communications session. Exemplary HIDs include a computer keyboard, a computer mouse, a touch screen display, and a microphone.

The audio playback devices enable a communicant to playback audio signals that are received during a virtual area communications session. Exemplary audio playback devices include audio processing hardware (e.g., a sound card) for manipulating (e.g., mixing and applying special effects) audio signals, and speakers for outputting sounds.

b. So3D Graphical Display, Avatar, and Physics Engine

The So3D engine is a visualization engine that controls the presentation of a respective view of a virtual area and objects in the virtual area on a display monitor of the client network node. The So3D engine typically interfaces with a graphical user interface driver and the HID devices to present the views of the virtual area and to allow the communicant to control the operation of the virtual-area-enabled communications applications 20, 22.

In some embodiments, the So3D engine receives graphics rendering instructions from the area service. The So3D engine also may read a local communicant avatar database that contains images needed for rendering the communicant's avatar in the virtual area. Based on this information, the So3D engine generates a visual representation (i.e., an image) of the virtual area and the objects in the virtual area from the point of view (position and orientation) of the communicant's avatar in the virtual area. The visual representation typically is passed to the graphics rendering components of the operating system, which drive the graphics rendering hardware to render the visual representation of the virtual area on the client network node.

The communicant can control the presented view of the virtual area by inputting view control commands via a HID device (e.g., a computer mouse). The So3D engine updates the view of the virtual area in accordance with the view control commands. The So3D engine also updates the graphic representation of the virtual area on the display monitor in accordance with updated object position information received from the area service.

c. System Database and Storage Facility

The system database and storage facility stores various kinds of information that is used by the platform. Exemplary information that typically is stored by the storage facility includes the presence database, the relationship database, an avatar database, a real user id (RUID) database, an art cache database, and an area application database. This information may be stored on a single network node or it may be distributed across multiple network nodes.

5. Exemplary Communication Session

During a communication session, each of the client network nodes 12, 14 generates a respective set of realtime data streams (e.g., motion data streams, audio data streams, chat data streams, file transfer data streams, and video data streams). For example, each communicant manipulates one or more input devices (e.g., a computer mouse and a keyboard) that generate motion data streams, which control the movement of his or her avatar in the virtual area 32. In addition, the communicant's voice and other sounds that are generated locally in the vicinity of the computer system typically are captured by a microphone. The microphone generates audio signals that are converted into realtime audio streams. Respective copies of the audio streams are transmitted to the other network nodes that are represented by avatars in the virtual area 32. The sounds that are generated locally at these other network nodes are converted into realtime audio signals and transmitted to the computer system. The computer system converts the audio streams generated by the other network nodes into audio signals that are rendered by speakers. The motion data streams and audio streams may be transmitted from each of the communicant nodes to the other client network nodes either directly or indirectly. In some stream handling topologies, each of the client network nodes receives copies of the realtime data streams that are transmitted by the other client network nodes. In other stream handling topologies, one or more of the client network nodes receives one or more stream mixes that are derived from realtime data streams that are sourced (or originated) from other ones of the network nodes.

In some embodiments, the area service maintains global state information that includes a current specification of the virtual area, a current register of the objects that are in the virtual area, and a list of any stream mixes that currently are being generated by the network node hosting the area service. The objects register typically includes for each object in the virtual area a respective object identifier (e.g., a label that uniquely identifies the object), a connection handle (e.g., a URI, such as an IP address) that enables a network connection to be established with a network node that is associated with the object, and interface data that identifies the realtime data sources and sinks that are associated with the object (e.g., the sources and sinks of the network node that is associated with the object). The objects register also typically includes one or more optional role identifiers for each object; the role identifiers may be assigned explicitly to the objects by either the communicants or the area service, or may be inferred from other attributes of the objects or the user. In some embodiments, the objects register also includes the current position of each of the objects in the virtual area as determined by the area service from an analysis of the realtime motion data streams received from the network nodes associated with objects in the virtual area. In this regard, the area service receives realtime motion data streams from the network nodes associated with objects in the virtual area, tracks the communicants' avatars and other objects that enter, leave, and move around in the virtual area based on the motion data. The area service updates the objects register in accordance with the current locations of the tracked objects.

In the process of administering realtime data stream connections with other network nodes, the area service maintains for each of the client network nodes a set of configuration data, including interface data, a zone list, and the positions of the objects that currently are in the virtual area. The interface data includes for each object associated with each of the client network nodes a respective list of all the sources and sinks of realtime data stream types that are associated with the object. The zone list is a register of all the zones in the virtual area that currently are occupied by the avatar associated with the corresponding client network node. When a communicant first enters a virtual area, the area service typically initializes the current object positions database with position initialization information. Thereafter, the area service updates the current object positions database with the current positions of the objects in the virtual area as determined from an analysis of the realtime motion data streams received from the other client network nodes sharing the virtual area.

Exemplary spatial communication interfaces that are generated by embodiments of the virtual-area-enabled communications applications are described in U.S. patent application Ser. No. 12/354,709, filed Jan. 15, 2009, and U.S. patent application Ser. No. 12/509,658, filed Jul. 27, 2009, both of which are incorporated herein by reference.

C. Interfacing a Web Browser with the Spatial Communication Session

1. Configuring a Guest Communicant for Visualizing a Spatial Communication Session FIG. 3 shows an embodiment of a method by which a guest communicant network node is configured to visualize a spatial communication session.

Figure 3:
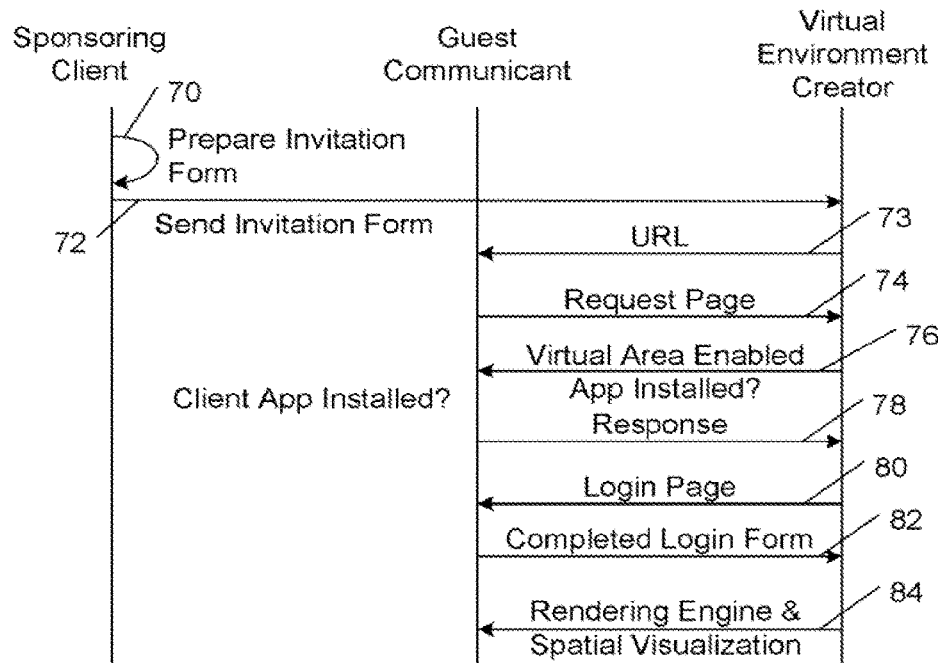
FIG. 3 is a flow diagram of an embodiment of a method by which a guest communicant network node is configured to visualize a spatial communication session.

A sponsoring one of the client communicants (e.g., a sponsoring communicant operating the client network node 12) initiates the process by preparing an invitation for the guest communicant (FIG. 3, process 70). In some embodiments, the sponsoring client communicant starts the guest invitation process by invoking a "send guest invitation" process, which is provided by the virtual-area-enabled communications application 20 running on the sponsoring client network node 12. This process generates a user interface that includes an invitation form that contains various fields into which the sponsoring client communicant can specify information about the guest communicant and the communication session to which the guest communicant will be invited. Among the exemplary types of information that can be specified are: (i) information about the guest communicant (e.g., name, business affiliation, and contact information, such as email address and telephone number); (ii) information about the communication session (e.g., start date and time, duration, virtual area location in which the communication session will take place, and a description of the nature or subject of the communication session); and (iii) the capabilities of the guest communicant during the spatial communication session. Exemplary types of capabilities include governance rules that define the scope of the guest communicant's ability to navigate in the virtual area, the scope of the guest communicant's ability to participate in file sharing and application sharing, and the scope of the guest communicant's ability to download, upload, or delete files in the virtual area.

The sponsoring client sends the completed invitation form to the virtual environment creator 18 (FIG. 3, process 72). In response, the virtual environment creator 18 generates a globally unique guest identifier for the guest communicant and sends to the guest communicant an invitation that includes a URL corresponding to the location of the communication session specified by the sponsoring client in the completed invitation form (FIG. 3, process 73). In some embodiments, the guest identifier is constructed from the contact information (e.g., the email address or phone number) that is provided by the sponsoring client in the completed invitation form. The invitation typically specifies a precise location in spatial communication environment where the communication session will take place. The virtual environment creator 18 determines a unique address for the specified communication session location based on the location specified by the sponsoring client. In some embodiments, the precise meeting location is addressed by a unique identifier, such as a URL.

Figure 4:
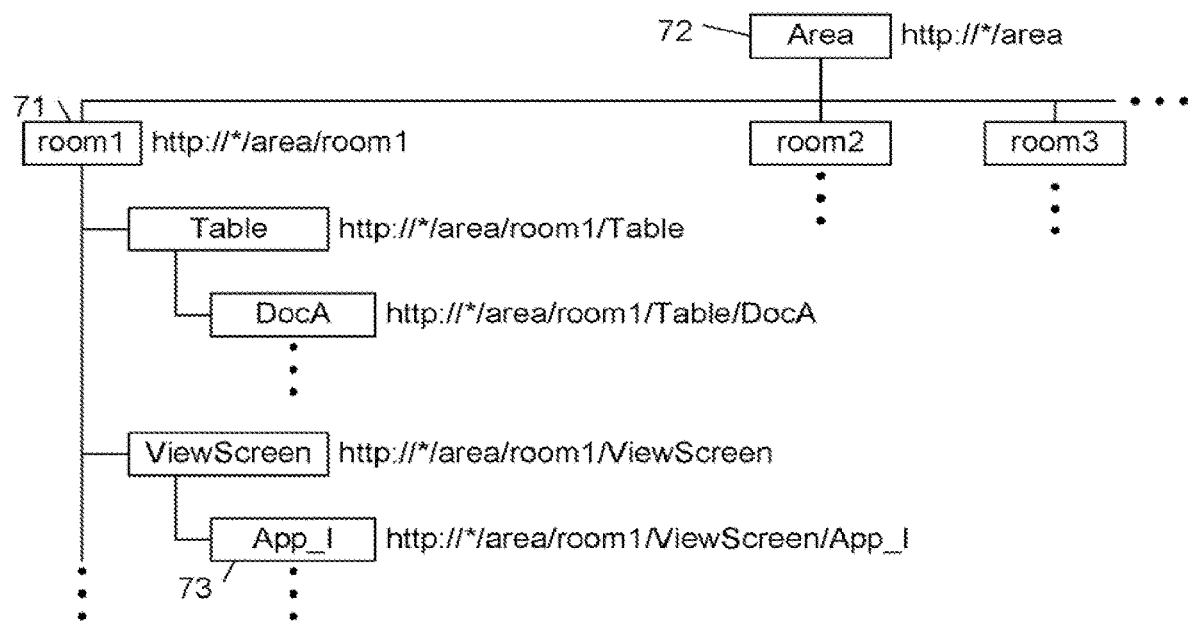
FIG. 4 shows an embodiment of a hierarchical representation of a virtual area.

FIG. 4 shows an exemplary model of a virtual area 72 as a spatial hierarchy of "places" or "locations" (i.e., room1, room 2, room3, . . . ) and objects or props (i.e., Table, ViewScreen, . . . ). The spatial hierarchy includes an ordered sequence of levels ranging from a top level (e.g., area 72) to a bottom level. Each of the places in a successive one of the levels of the spatial hierarchy is contained in a respective one of the places in a preceding one of the levels. Each of the objects in the spatial hierarchy is contained in a respective one of the places. In these embodiments, the places and the objects in the places are associated with respective URLs, which serve as unique addresses for the places and objects. This addressing scheme allows the sponsoring communicant to precisely specify to the virtual environment creator 18 where in the virtual area the guest communicant should be taken when he or she logs into the system. For example, the sponsoring client communicant may specify that the guest communicant should be presented with a view of room1 71 (i.e., http://*/area/room1) when he or she first accesses the system. Alternatively, the sponsoring client communicant may specify that the guest communicant should be presented with a view of the App_I application 73 (i.e., http://*/area/room1/ViewScreen/App_I) which is being shared on the ViewScreen object (i.e., http://*area/room1/ViewScreen).

Referring back to FIG. 3, the guest communicant sends to the virtual environment creator 18 a web browser request for the web page specified by the URL in the invitation from the guest network node 16 (FIG. 3, process 74). The virtual environment creator 18 determines whether or not the guest network node 16 has a version of the virtual-area-enabled communication application 20, 22 installed (FIG. 3, processes 76, 78).

If the virtual-area-enabled communication application is installed on the guest network node 16, the virtual environment creator 18 starts an instance of the virtual-area-enabled communication application on the guest network node, and the communication application instance presents the guest communicant with a view of the specified communication session location in an interface window. In some embodiments, information contained within the document retrieved by the specified URI is passed into the virtual-area-enabled communication application by means of registering an application protocol or MIME type with the operating system. In this way, the virtual-area-enabled communication application can be started, logged in, and potentially sent directly to the meeting location specified in the original invitation without the user having to manually do so (in some cases), by simply clicking the URL. For example, in some embodiments, the virtual-area-enabled communication application is served a URI (e.g., sococo://information-to-pass-in-to-the-virtual-area-enabled communication-application). In other embodiments, the browser application is served with a MIME type header associated with the virtual-area-enabled communication application (e.g., Content-type: sococo/application, followed by XML instructions to go to zone x). The browser application may be configured to present the guest user with a confirmation dialog box once the document asks to interact with the communication applications 20, 22 operating on the client nodes 12, 14. In this way, guest users can be uniquely on-ramped into the proper location in the virtual area 32. This experience can be properly routed on a variety of platforms. For instance, a smart phone could be configured to access a meeting experience in the virtual area 32 over the internet based on a URL by launching a native application on that smart phone and passing in the same information set described above.

In response to a determination that the virtual-area-enabled communication application is not installed on the guest network node 16, the virtual environment creator 18 sends to the web browser application 24 a login page that contains a login form (FIG. 3, process 80). The guest communicant completes the login form and the web browser application 24 sends the completed login form to the virtual environment creator 18 (FIG. 3, process 82). After the virtual environment creator 18 has authenticated the guest communicant based on the data contained in the completed login form, the virtual environment creator 18 sends the web browser application 24 an instance of the rendering engine 26 along with an interface specification that includes a visualization of the virtual area to which the guest communicant has been invited (FIG. 3, process 84). The web browser application 24 installs the rendering engine 26, and the rendering engine 26 renders the visualization in the browser window 52.

In some embodiments, the virtual environment creator 18 sends the guest communicant's web browser application 24 an interface specification that includes specifications of the graphical representation of the virtual area and the graphical representations of the client communicants and their respective current locations in the virtual area. The interface specification typically is sent to the guest network node 16 in an extensible markup language (XML) format. The elements of the interface specification are represented using a tag-based hierarchical language in accordance with an XML schema (XSD). The following XML specification represents an exemplary virtual area room (i.e., "Office A") that includes four seats, a table, and two viewscreen props:

```
- <room name="Office A" artwork="office" size="3800,3200">
  - <!-- Office 17, 18 -- >
  - <seats template="StdSeats">
    <chair coord="1612,1748" />
```

```
                <chair coord="2687,1748" />
                <chair coord="2287,956" />
                <chair coord="1212,956" />
            </seats>
            <label name="OfficeLabel" origin="center" coord="1900,500"
                size="3800,450" text="$ZoneLabel;" typeface="OfficeLabel"
                justify="center" />
            <prop name="walls" bitmap="walls_office" origin="topleft" coord="0,0"
                size="3800,3200" />
            <prop name="table" template="StdTable" coord="1900,2621" />
- <!-- < prop name="bell" template="StdBell" coord="2020,2646" />
-    < kvmzone name="Screen 1" size="3800,3200">
            <screen name="Screen 1" template="ScreenW" label="Screen 1"
                coord="581,1772" rotation="0" />
        - <seats template="StdSeats">
                <chair coord="704,2395" />
            </seats>
        </kvmzone>
-   <kvmzone name="Screen 2" size="3800,3200">
            <screen name="Screen 2" template="ScreenE" label="Screen 2"
                coord="3218,1772" rotation="180" />
        - <seats template="StdSeats">
                <chair coord="3095,2395" />
            </seats>
    </kvmzone>
</room>
```

The positions of the graphic representations (i.e., avatars) of the communicants in the virtual area typically are represented in an XML specification that is separate from the specification of the geometric elements of the virtual area. An exemplary message that indicates the positions of the avatars may have the following XML specification:

```
<a:SodaDefinition Name="SodaZonePositionData">
    <a:IDField Name="ID" Type="UUID" Value="1cb68e80-
        17d1-4758-8114-c911780c37f3"/>
    <a:LengthField Name="length" Type="Short"/>
    <a:Field Name="zone" Type="UUID"/>
    <a:Field Name="x" Type="Integer"/>
    <a:Field Name="y" Type="Integer"/>
    <a:Field Name="z" Type="Integer"/>
</a:SodaDefinition>
```

Where the "SodaZonePositionData" is a message sent down in protocol to a regular desktop communication application. The fields identify the avatar (by a universally unique identifier (UUID)), the zone they are in (identified again by a UUID), and an x, y, and z coordinate corresponding to the avatars position in the zone. This information is packetized and sent to the communication application as a stream of state information, and there are messages associated with all manner of properties (profile, color, artwork, microphone on, microphone off, etc).

In some embodiments, the positions of the avatars in the web browser may be embodied in a slightly different format that makes use of off the shelf data processing libraries. For example, avatar position specification may take the form of XML, JSON, or other data encapsulation techniques. In XML, the avatar position specification might look like:

```
<SodaZonePositionData>
    <ID>2eb68e81-17f1-8758-2914-d83480c37f6</ID>
    <Zone>1cb68e80-17d1-4758-8114-c911780c37f3</Zone>
    <X>25</X>
    <Y>38</Y>
    <Z>0</Z>
</SodaZonePositionData>
```

The web browser application takes the XML avatar position specification, parses the fields, and applies the position and zone information to the avatar with the matching ID. The same concept would be applied to the rest of the state information for any other element (e.g., prop, avatar, and geometry).

Figure 5:
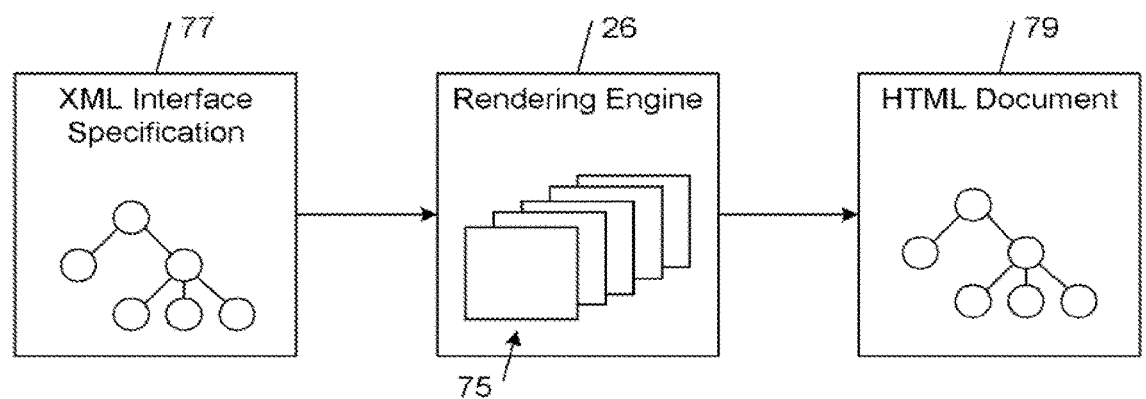
FIG. 5 is a block diagram of an embodiment of a rendering engine transforming an XML interface specification into an HTML document.

Referring to FIG. 5, in these embodiments, the rendering engine 26 is an extensible style sheet language transformation (XSLT) engine that uses one or more templates 75 to transform an XML interface specification 77 into an HTML document 79 (e.g., a dynamic HTML (DHTML) document) that can be rendered in a browser window by the web browser application 24. In this process, the XSLT rendering engine 26 matches nodes in the XML interface specification to one or more templates, which specify how to transform the XML nodes into elements of the HTML document 79. The HTML document 79 describes a presentation format for displaying an interface that contains the spatial visualization of the realtime communication session.

A browser interface script (e.g., JavaScript), which may be part of the rendering engine 26 or a separate plugin, uses one or more event handlers for detecting user interactions with the rendering interface specification. Exemplary interactions include computer mouse actions (e.g., mouse pointer movements and button clicks), keyboard actions, and joystick actions. The browser interface script typically sends the virtual environment creator 18 an XML document that reports certain user interactions with the spatial interface that is presented on the guest communicant's terminal. For example, the browser interface script typically reports user interactions that control the state (e.g., the position or presence) of the guest communicant in the virtual area and user interactions that involve interacting with other communicants (e.g., initiating a peer-to-peer chat with another communicant or inviting another communicant to join the guest communicant in the virtual area). In some embodiments, the browser interface script interprets the detected user interactions to control local parameters on the guest communicant's terminal (e.g., local speaker and local microphone volume).

In some embodiments, during the shared communication session, the web browser application 24 sends to the virtual environment creator 18 a message that references a location in the graphical representation of the virtual area 32. For example, in some of these embodiments, the guest communicant is able to navigate to a particular location in the virtual area by selecting the particular location (e.g., by clicking or double-clicking a computer mouse with a pointer positioned on the particular location). An event handler detects the selection and a browser script reports the selection to the virtual environment creator by issuing an HTTP message that includes, for example, the coordinates or unique identifier (e.g., URL) of the selected location in the visualization of the virtual area. In response to the HTTP message, the virtual environment creator 18 generates an update to the graphical visualization of the shared communication session and transmits a respective interface specification of the update to each of the client and guest network nodes in the virtual area 32. The update may, for example, include a specification of a visualization of the virtual area with the guest communicant's avatar moved to the selected location.

In some embodiments, the spatial visualization of the virtual area is divided into an array of non-overlapping graphical blocks, each of which corresponds to respective division of the spatial visualization. In response to an update request received from the web browser application 24, the virtual environment creator 18 sends to the web browser application 24 only those graphical blocks that have changed since a most recent response to a preceding update request was sent.

In some embodiments, during the shared communication session, the web browser application 24 sends the virtual environment creator 18 messages in association with the shared communication session. The messages typically reference the graphical visualization of the shared communication session. For example, some messages reference selected locations in the graphical visualization of the virtual area; some messages reference objects (e.g., communicant avatars and props) in the virtual area; and other messages reference selected buttons in a graphical representation of a toolbar that includes navigation and interaction controls. The navigation controls enable the communicant to specify where to establish a presence in the virtual area and the interaction controls enable the communicant to manage interactions with one or more of the client communicants in the network communication environment.

In some embodiments, the guest communicant connects directly with the virtual environment creator 18 via a server node that handles HTTP/web requests from the guest node 16. In these embodiments, a sponsoring client network node is not used to interface the guest communicant with the virtual area. Instead, the server node queues up all the realtime data stream (RDS) state activity, chat, and anything else that can be served with a delay and is suitable for transmission over a reliable channel (as opposed to voice/video streams which typically are not served on a reliable channel due to bandwidth constraints). In this way, data such as avatar position, headset/microphone state, head flashing cues, eye cues, and chat can be communicated directly, as opposed to through a peer-to-peer connection between the sponsoring client network node and the guest node. In some of these embodiments, the guest node browser application is configured to poll the server node on a regular interval for the queued state/other information, and propagate all changes through the virtual area rendering engine. In other embodiments, the server node is configured to set up a long lived HTTP connection with the guest node 16, format the queued state/other information in an XML or other data encapsulation format, and stream the formatted data down to the web browser application 24.

Figure 6:
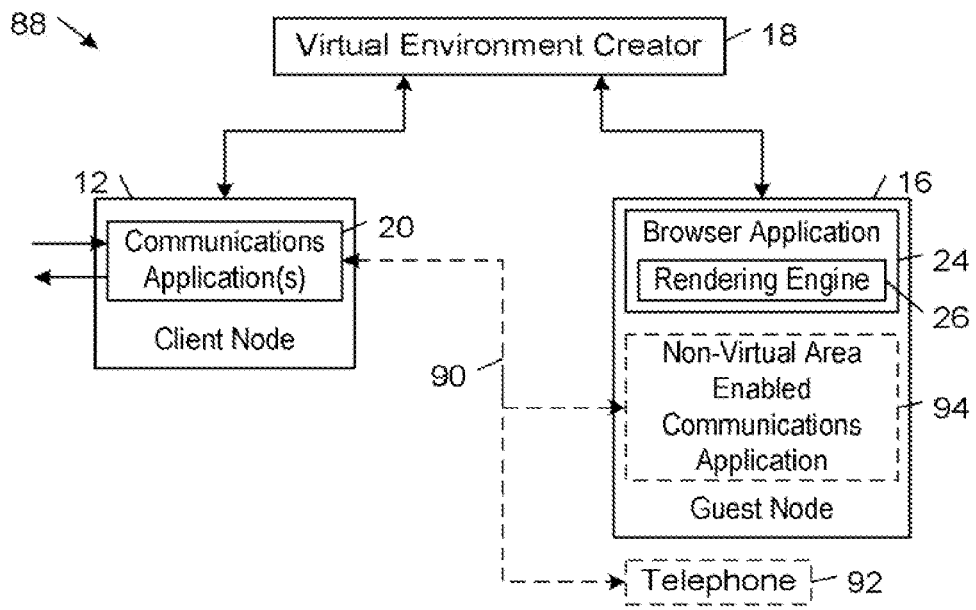
FIG. 6 is a block diagram of an embodiment of a network communications environment.

2. Configuring a Guest Communicant for Realtime Audio Communications in a Spatial Communication Session a. Audio Integration of the Guest Communicant Mediated by a Sponsoring Client Network Node FIG. 6 shows an embodiment 88 of the network communications environment 10 in which the client network node 12 is configured to establish an audio communication channel 90 with the guest communicant outside the domain of the web browser application 24 without requiring the guest communicant to run an instance of the virtual-area-enabled communications application 20, 22.

In some embodiments, the instance 20 of the virtual-area-enabled communications application running on the sponsoring client network node 12 is operable to establish an audio communication channel with a telephone 92 (e.g., a mobile telephone or a wired telephone) that is being operated by the guest communicant outside the domain of the web browser application 24. In these embodiments, the communications application 20 either has an integrated voice over internet protocol (VOIP) component or communicates with the programmatic interface of a separate VOIP application operating on the client network node 12. The VOIP component or VOIP application controls the set-up and tear-down of calls in accordance with a session control protocol. The VOIP component or VOIP application uses audio codecs to encode outgoing voice signals received from a sound card on the client network node 12 into IP packets that can be transmitted over an IP network as digital audio via an audio stream. Incoming calls from the guest communicant's telephone are sent over the local PSTN network to the nearest gateway server. The gateway server digitizes the analog voice signal, compresses it into IP packets, and sends the IP packets over the network (e.g., the internet) to another gateway at the receiving end. The receiving gateway sends the incoming call packets to the VOIP component or VOIP application on the sponsoring client network node 12. The VOIP component or VOIP application uses the audio codecs to decode the incoming IP packets into voice signals that can be converted into sounds by the sound card on the sponsoring client network node 12.

In other embodiments, the instance 20 of the virtual-area-enabled communications application running on the client network node 12 is operable to establish an audio communication channel with a non-virtual-area-enabled communications application 94 executing on the guest network node 16. In these embodiments, the virtual-area-enabled communications application 20 either has an integrated VOIP component or communicates with the programmatic interface of a separate VOIP application operating on the client network node 12. The VOIP component or VOIP application on the sponsoring client network node 12 controls the set-up and tear-down of calls in accordance with a session control protocol. The non-virtual-area-enabled communications application 94 operating on the guest network node 16 is a VOIP communications application that can communicate realtime audio data streams (and potentially other realtime data streams, e.g., video and chat realtime data streams) with the VOIP component or VOIP application operating on the sponsoring client network node 12. The VOIP communications between the sponsoring client network node 12 and the non-virtual-area-enabled communications application operating on the guest network node 16 may be based on a client-server model or a peer-to-peer model.

In some embodiments, the sponsoring client network node 12 interfaces the guest communicant with one or more other client network nodes communicating over respective peer-to-peer connections. In other embodiments, a proxy/transceiver/stream multiplier server node interfaces the guest communicant with the client network nodes. In these embodiments, the use of the proxyltransceiver/stream multiplier server node reduces the load on the sponsoring client network node 12 from both a computing power perspective and a network bandwidth perspective.

Figure 7:
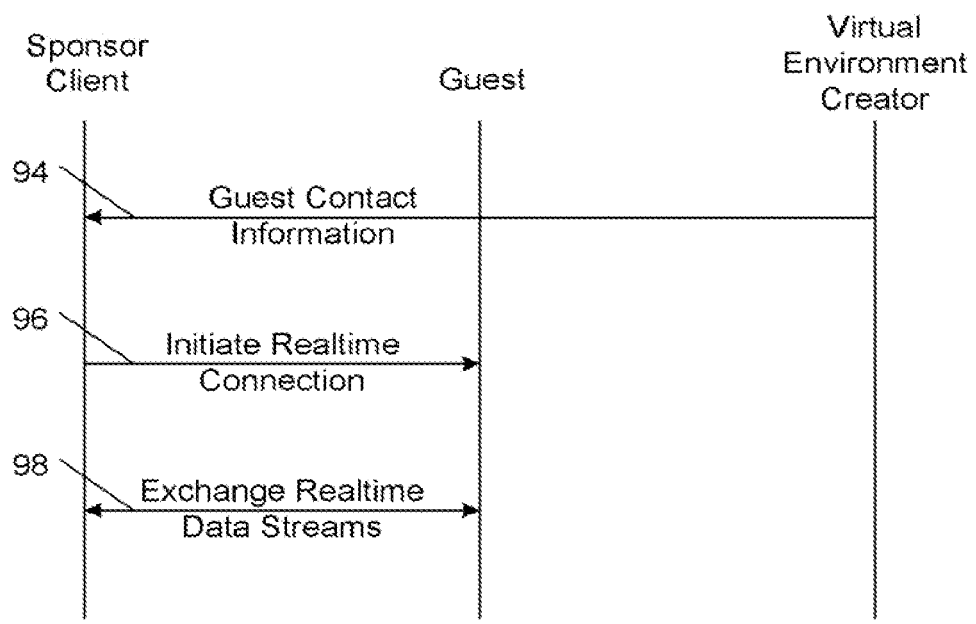
FIG. 7 is a flow diagram of an embodiment of a method by which a realtime audio communication channel is established between a sponsoring client network node and a guest communicant.

FIG. 7 shows an embodiment of a method by which a realtime audio communication channel is established between the sponsoring client network node 12 and the guest communicant. In accordance with this method, the virtual environment creator 18 sends to the sponsoring client network node 12 the contact information contained in the completed login form received from the guest communicant (FIG. 7; process 94). The contact information may be, for example, a telephone number (e.g., a mobile, landline, or VOIP telephone number) or any other type of call-in identifier or address (e.g., a unique VOIP name or address) that can be used to establish an audio communication channel with the guest communicant. The sponsoring client network node 12 uses the virtual-area-enabled communications application 20 to initiate a realtime audio connection with the guest communicant (FIG. 7, process 96). The audio connection may be established between, for example, a VOIP component of the virtual-area-enabled communications application 20 or a separate VOIP application operating on the sponsoring client network node 12 and either the guest communicant's telephone 92 or the non-virtual-area-enabled communications application 94. After the audio communication channel has been established, the sponsoring client network node 12 and the guest communicant exchange realtime audio data streams over the audio communications channel (FIG. 7, process 98).

Figure 8:
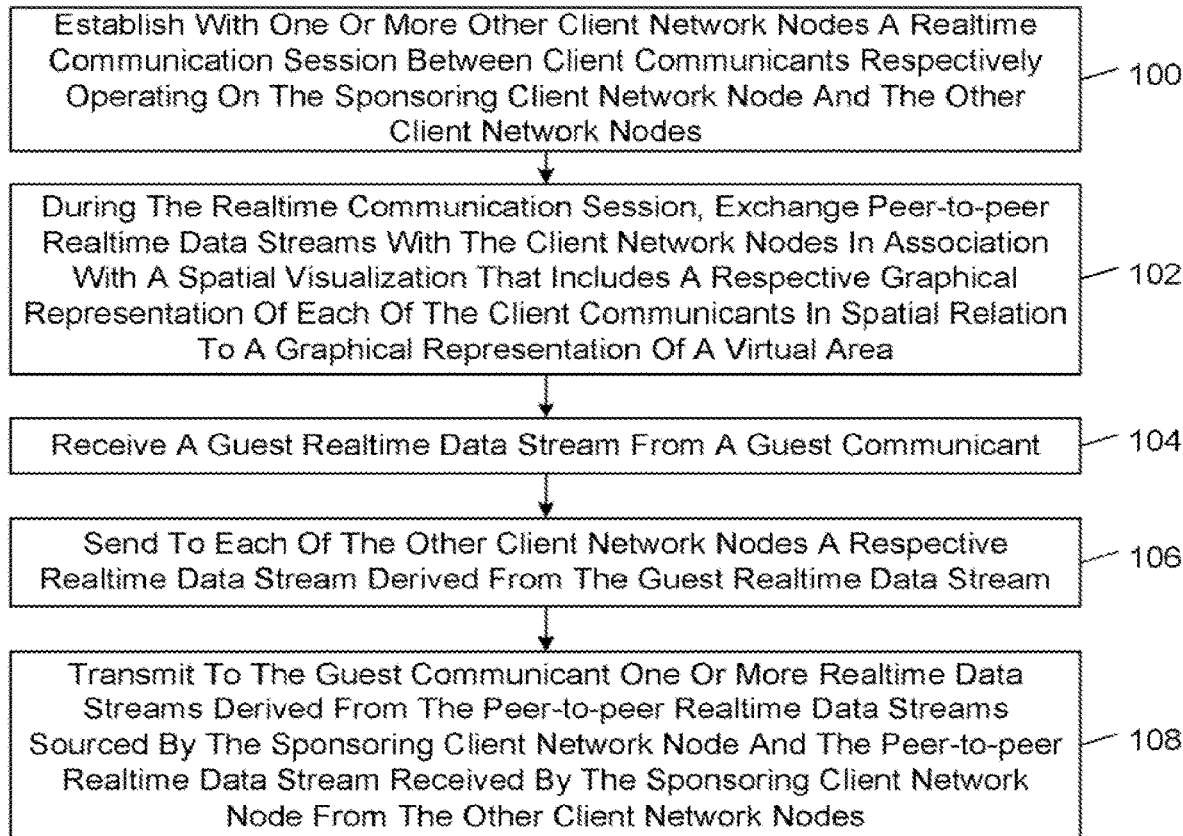
FIG. 8 is a flow diagram of an embodiment of a method by which a virtual-area-enabled communications application executing on a sponsoring client network node integrates audio communications received from a guest communicant into a spatial communications session.

FIG. 8 shows an embodiment of a method by which the virtual-area-enabled communications application 20 executing on the sponsoring client network node 12 integrates the audio communications received from the guest communicant into a spatial communications session. In accordance with this embodiment, the virtual-area-enabled communications application 20 establishes a realtime communication session with one or more other client network nodes being operated by respective client communicants (FIG. 8, block 100). During the realtime communication session, the virtual-area-enabled communications application 20 exchanges peer-to-peer realtime data streams with the client network nodes in association with a spatial visualization that includes a respective graphical representation of each of the client communicants in spatial relation to a graphical representation of a virtual area (FIG. 8, block 102). The virtual-area-enabled communications application 20 receives a guest realtime data stream from a guest communicant (FIG. 8, block 104). The virtual-area-enabled communications application 20 sends to each of the other client network nodes a respective realtime data stream derived from the guest realtime data stream received from the guest communicant (FIG. 8, block 106). The virtual-area-enabled communications application 20 transmits to the guest communicant one or more realtime data streams that are derived from the peer-to-peer realtime data streams sourced by the sponsoring client network node and the peer-to-peer realtime data streams that are received by the sponsoring client network node from the other client network nodes (FIG. 8, block 108).

Figure 9:
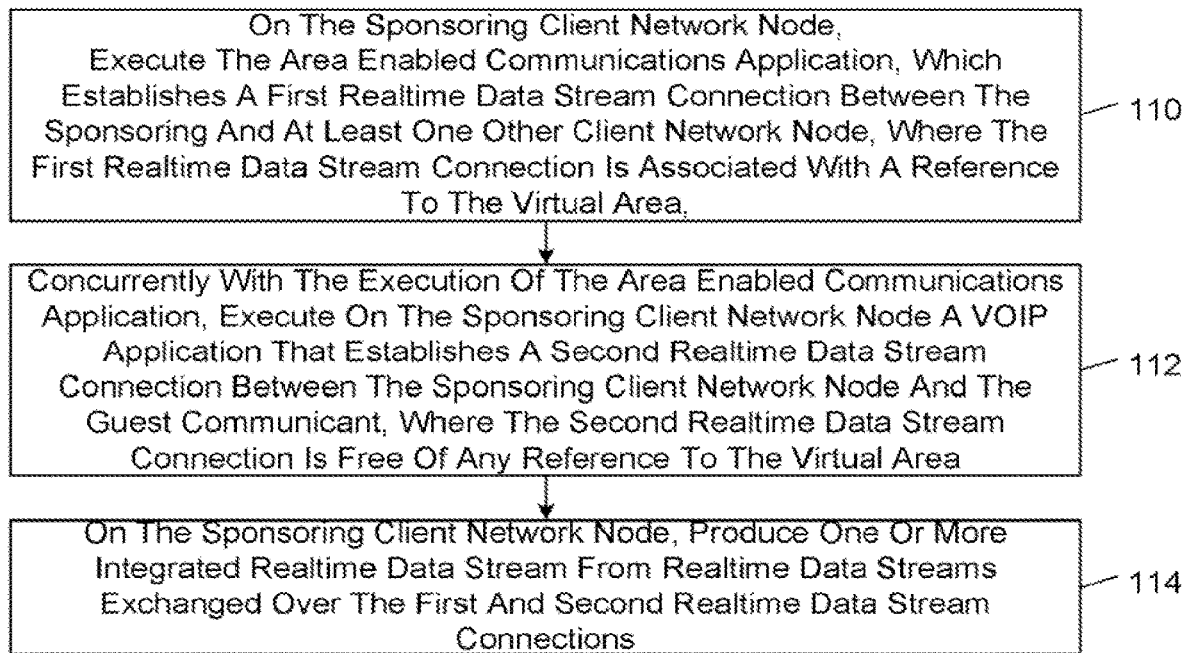
FIG. 9 is a flow diagram of an embodiment of a method by which a sponsoring client network node communicates with virtual-area-enabled and non-virtual-area-enabled network nodes.

FIG. 9 shows an embodiment of the method of FIG. 8 in which the sponsoring client network node 12 communicates with the other client network nodes 14 via the virtual-area-enabled communications application 20 and communicates with the guest communicant via a separate VOIP application. In accordance with this method, the virtual-area-enabled communications application 20 is executed on the sponsoring client network node 12 (FIG. 9, block 110). The virtual-area-enabled communications application 20 establishes a first realtime data stream connection between the sponsoring client network node 12 and at least one other client network node 14, where the first realtime data stream connection is associated with a reference to the virtual area 32. Concurrently with the execution of the virtual-area-enabled communications application 20, a VOIP application is executed on the sponsoring client network node 12 (FIG. 9, block 112). The VOIP application establishes a second realtime data stream connection between the sponsoring client network node 12 and the guest communicant, where the second realtime data stream connection is free of any reference to the virtual area 32. On the sponsoring client network node 12, one or more integrated realtime data streams are produced from realtime data streams that are exchanged over the first and second realtime data stream connections (FIG. 8, block 114).

At least one of the one or more integrated realtime data streams typically is rendered on the sponsoring client network node 12. The virtual-area-enabled communications application 20 typically transmits respective ones of the one or more integrated realtime data streams to the other client network node 14.

In some embodiments, the virtual-area-enabled communications application 20 generates a first realtime data audio stream; the virtual-area-enabled communications application 20 receives a second realtime audio data stream from the other client network node 14; and the virtual-area-enabled communications application 20 receives a third realtime audio data stream from the guest communicant. In these embodiments, the process of producing the integrated realtime data streams involves mixing the second and third realtime data streams to produce a first integrated realtime data stream, mixing the first and third realtime data streams to produce a second integrated realtime data stream, and mixing the first and second realtime data streams to produce a third integrated realtime data stream. The virtual-area-enabled communications application 20 renders the first integrated realtime data stream on the sponsoring client network node 12, transmits the second integrated realtime data stream from the sponsoring client network node 12 to the other client network node 14, and sends the third integrated realtime data stream from the sponsoring client network node 12 to the guest communicant. In some embodiments, the virtual-area-enabled communications application 20 passes the third integrated realtime data stream to the virtual-area-enabled communications application 22 operating on the other client network node 14. In some embodiments, the first and second realtime data streams respectively are generated by first and second instances 20, 22 of the virtual-area-enabled communications application respectively executing on the client network nodes 12 and 14, and the virtual-area-enabled communications application 20 on the sponsoring client network node 12 passes the second integrated realtime data stream from the area enable communications application 20 to the second instance of the area enable communications application 22.

In one exemplary embodiment, the guest communicant is a VOIP contact of the sponsoring client communicant, but the guest communicant is not a user of the virtual-area-enabled communications application 20, 22. By integrating with the programmatic interfaces of the VOIP application, the virtual-area-enabled communications application 20 gets and displays the sponsoring client communicant's VOIP contacts directly in the communications interface presented on the sponsoring client network node 12. Clicking on a user interface control (e.g., "Call Contact") in the VOIP application's contacts interface initiates a call to the guest communicant using the VOIP application. The communications application 20 takes the audio stream received from the guest communicant and multiplexes it into the audio streams of the other client communicants in the virtual area 32. In this way, the guest communicant can participate in a spatial virtual conversation albeit with only an audio experience as provided by the VOIP application.

In some embodiments, a one way audio stream is initiated and downloaded to the browser application without requiring external plug-ins. In these embodiments, a mix of the conversation in a given zone is sent to the browser application so that a guest communicant could listen to the conversation. Although the guest communicant cannot participate in the conversation by sourcing a realtime audio stream from the web browser application, the guest communicant may participate via more asynchronous channels (e.g., text chat) that are easier to implement in the context of the web browser application. These embodiments may provide particular utility in meetings in which the guest communicant in not the primary focus of the meeting (e.g., a meeting in which there are many observers but only a few key participants, such as a tradeshow or a speaker panel).

Figure 10:
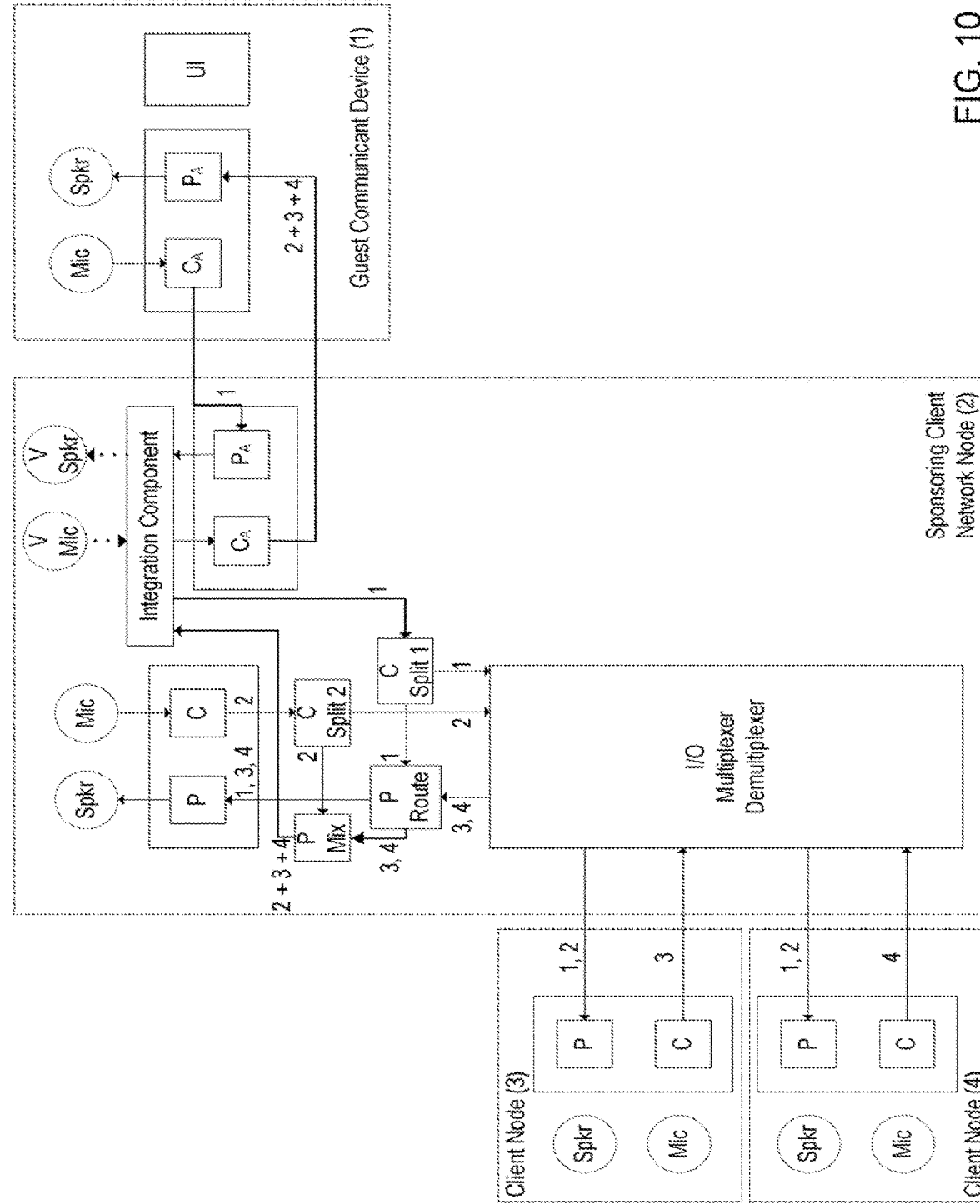
FIG. 10 is a block diagram of an embodiment of communication infrastructure that enables communicants operating virtual-area-enabled communications applications to communicate with non-area-enabled communication devices.

FIG. 10 is a block diagram of an embodiment of communication infrastructure that enables communicants operating virtual-area-enabled communications applications to communicate with non-area-enabled communication devices. FIG. 9 shows the audio communication channels that are established between four network nodes (i.e., non-area-enabled Guest Communicant Device 1, Sponsoring Client Network Node 2, Client Network Node 3, and Client Network Node 4) sharing a virtual area. Guest Communicant Device 1 represents a client terminal that is not configured to run the virtual-area-enabled communications application; instead, Guest Communicant Device 1 is configured to operate an alternative communication system (e.g., a network node operating a non-area-enabled communication application, such as a VOIP application, or another non-area-enabled communication device, such as a telephone). Sponsoring Client Network Node 2 represents the sponsoring client communicant's terminal that is running the virtual-area-enabled communications application 20, which additionally includes an integration component that virtualizes the guest communicant's communication system's playback and audio capture streams. Client Network Nodes 3 and 4 represent two other client terminals that are running respective instances of the virtual-area-enabled communications application. A summary of the system shown in FIG. 10 is provided in the following text block:

C: Audio Capture Component
P: Audio Playback Component
$C_A$: Audio Capture, Alternate Audio System
$P_A$: Audio Playback, Alternate Audio System
Integration Component: Virtualizes Alternate Playback and Capture streams. Sends Microphone (Mic) 1 to C Split 1 received from virtualized Alternate Playback, receives Microphone 2, 3 and 4 mix from P Mix and sends to virtualized Alternate Capture for transmission to System 1
V Mic: Virtual Microphone associated with System 2 Alternate Audio
V Spkr: Virtual Speaker(s) associated with System 2 Alternate Audio
C Split 1: Receive Mike 1 from Integration Component, Sends Mike 1 to both P Route and I/O Mux/Demux
C Split 2: Receive Microphone 1 from System 2 Capture, Sends Microphone 2 to P Mix and I/O Mux/Demux
P Route: Receives Microphone 1 from C Split 1, and Microphones 2 and 3 from I/O Mux/Demux, sends Microphones 1, 3 and 4 to System 2 Playback and Microphones 3 and 4 to P Mix
P Mix: Receives Microphone 2 from C Split 2 and Microphones 3 and 4 from P Route, sends a mix of Microphones 2, 3 and 4 to Integration component (for transmission out virtualized)

In operation, the I/O Multiplexer Demultiplexer sends the audio signals 1 and 2 that are received from the sponsoring client network node 1 and the guest communicant device 2 to both client network node 3 and client network node 4. The 1/O Multiplexer Demultiplexer also sends the audio signals 3 and 4 received from client network nodes 3 and 4 to the P Route component of the sponsoring client network node 2. The P Route component sends the audio signals 1, 3, and 4 to the playback component of the sponsoring client network node 2 and passes the audio signals 3 and 4 to the P mix component of the sponsoring client network node 2. The P Mix component of the sponsoring client network node 2 mixes the audio signals 2, 3, 4 and passes the mixed signal to the integration component of the sponsoring client network node 2. The integration component passes the mixed signal to the audio capture component of an alternative communications application (e.g., a VOIP application) that is running on the sponsoring client network node 2. In some embodiments, this alternative communications application corresponds to the same type of communications application (e.g., a VOIP application) that is being used by the guest communicant's device 1. The alternative audio capture system ($C_A$) passes the captured mixed signal 2+3+4 to the playback component of the alternative communications application running on the guest communicant's device 1.

In some implementations of the system shown in FIG. 10, P Mix also could subscribe to I/O Multiplexer/Demultiplexer directly, making the system more symmetric. P Route becomes P Mix 1, and receives 3, 4 from 1/O and 1 from C Split 1. Since these are sent as independent channels, the output of C Split 1 could be sent directly to the Playback Component, but that isn't quite as flexible (since P Mix could perform an actual mix instead of a pass through of independent channels, see below). In this case, P Mix becomes P Mix 2 and receives 3, 4 from I/O and 2 from C Split 2. The output of this mixer is a true mix, since the Alternate Audio System is a single channel communication system (even if the channel is stereo, there typically is no multi-track mixer at the other end to combine signals from multiple sources).

FIG. 10 does not show the interaction between the client network nodes 3 and 4 with one another, only with the sponsoring client network node 2 and by extension, the guest communicant's device 1. The interaction between client network nodes 3 and 4 could be either peer-to-peer or server-mediated as described above.

In FIG. 10, any time two streams are delimited with a comma (meaning that it is a multichannel route), the system could also be sending mixed streams to conserve internal communication resources (e.g. out of the I/O Multiplexer/Demultiplexer). The stream that must be mixed is indicated with plus signs (i.e. the virtualized microphone signal sent by the Integration Component to the alternate capture component $C_A$).

In some embodiments, the communications application 20 is able to determine the communication state of guest communicant based on the state of the audio communication channel that is established between the client network node 12 and the guest network node 16. During the realtime communication session, the communications application 20 establishes a realtime data stream connection with the guest communicant, determines current communication states of the guest communicant from the realtime data stream connection, and depicts in the spatial visualization visual cues that show the determined current communication states of the guest communicant. In some embodiments, the virtual environment creator 18 receives data describing a communication state of a realtime communication channel over which the sponsoring client network node 12 and the guest network node 16 are communicating outside the domain of the web browser application 14. In response, the virtual environment creator 18 sends to the web browser application 24 a second network communication that includes a specification of a visual cue that is renderable in association with the graphical visualization of the shared communication session to depict the communication state of the communicant operating the sponsoring client network node 12.

In some embodiments, the communications application 20 determines a connection status of the realtime data stream connection, and classifies the guest communicant into one of a connected state or an unconnected state based on the determined connection status of the realtime data stream connection. The communications application 20 depicts respective visual cues indicating which of the connected and unconnected states the guest communicant currently is classified.

In some embodiments, the communications application 20 classifies the guest communicant into an actively communicating state in response to a detection of a current realtime data stream over the realtime data stream connection, and classifies the guest communicant into a non-communicating state in response to a failure to detect a current realtime data stream over the realtime data stream connection. The communications application 20 depicts respective visual cues indicating which of the actively communicating and non-communicating states the guest communicant currently is classified.

Figure 11:
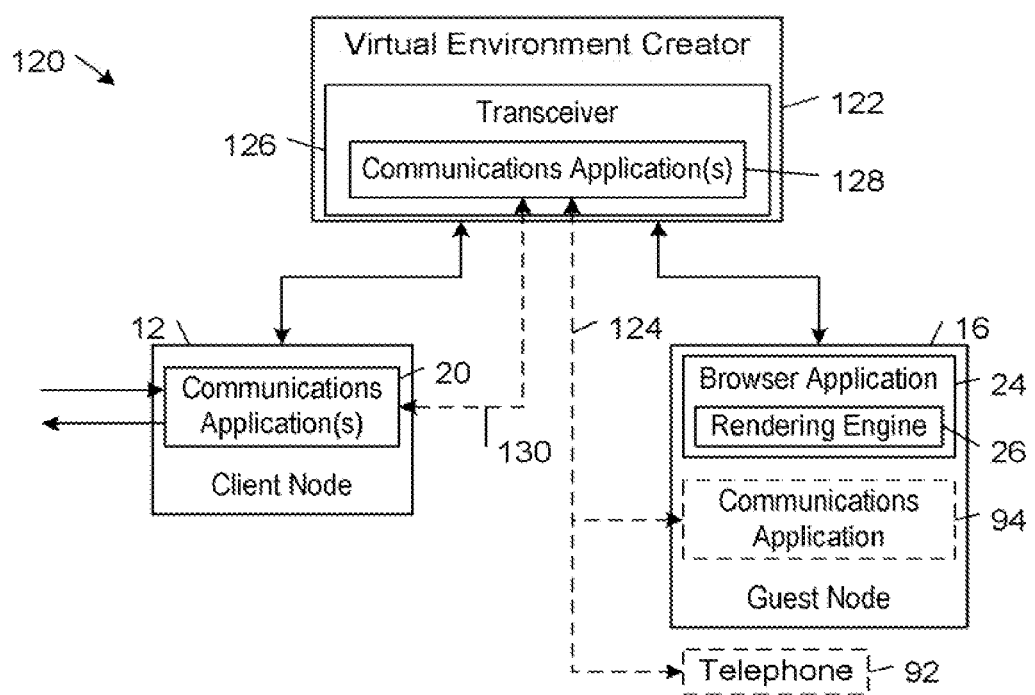
FIG. 11 is a block diagram of an embodiment of a network communications environment.

During the realtime communication session, the communications application 20 typically receives specifications of current positions of the graphical representation of the guest communicant in the virtual area from the virtual environment creator 18. In these embodiments, the individual (unmixed) realtime audio data streams typically are labeled respectively with the globally unique identifiers that are assigned to the communicants who sourced the realtime data streams. Since the guest realtime data stream and the graphical representation of the guest communicant respectively are associated with the same unique guest identifier that is assigned to the guest communicant, the communications application is able to depict the visual cues in association with the current positions of the graphical representation of the guest communicant in the virtual area based on the unique guest identifier.

b. Audio Integration of Guest Communicant Mediated by the Virtual Environment Creator FIG. 11 shows an embodiment 120 of the network communications environment 10 in which an embodiment 122 of the virtual environment creator 18 is configured to establish an audio communication channel 124 with the guest communicant outside the domain of the web browser application 24 without requiring the guest communicant to run an instance of the virtual-area-enabled communications application 20, 22. The virtual environment creator 122 includes a transceiver 126 that runs one or more instances 128 of a communications application (e.g., a VOIP communications application) that enable the transceiver to send realtime audio data streams 130 derived from audio data streams received from one or more of the client network nodes 12, 14 to the guest communicant's device, and to send realtime audio data streams derived from audio data streams received from the guest communicant's device to one or more of the client network nodes 12, 14.

In some embodiments, the transceiver 126 receives realtime audio streams from each of the client network nodes 12, 14 and the guest communicant's device, creates respective mixes of the appropriate ones of the received audio streams, and transmits the respective mixes to the client network nodes 12, 14 and the guest communicant's device.

In other embodiments, the transceiver 126 relays the realtime audio streams 124 received from the guest communicant's device to the sponsoring client network node 12. The sponsoring client network node 12 creates a mix of the guest communicant's realtime audio stream with its own locally generated realtime audio stream and transmits the mix to the other client network nodes 14 in the virtual area peer-to-peer. The sponsoring client network node 12 also creates a mix of its own locally generated realtime audio stream and the peer-to-peer realtime audio streams received from the other client network nodes 14 in the virtual area and transmits the mix to the transceiver 126, which relays the mix to the guest communicant's device.

In some embodiments, the communications application 128 running on the transceiver 126 is operable to establish an audio communication channel with a telephone 92 (e.g., a mobile telephone or a wired telephone) that is being operated by the guest communicant outside the domain of the web browser application 24. In these embodiments, the communications application 128 either has an integrated voice over internet protocol (VOIP) component or communicates with the programmatic interface of a separate VOIP application operating on the transceiver 126. The VOIP component or VOIP application controls the set-up and tear-down of calls with the guest communicant's telephone 92 in accordance with a session control protocol. Outgoing calls from the guest communicant's telephone 92 are sent over the local PSTN network to the nearest gateway server. The gateway server digitizes the analog voice signal, compresses it into IP packets, and sends the IP packets over the network (e.g., the internet) to another gateway at the receiving end. The VOIP component or VOIP application on the transceiver 126 encodes the IP packets received from the other gateway into a format that can be interpreted by the instances 20, 22 of the communications application operating on the client network nodes and transmits the encoded IP packets to one or more of the client network nodes 12, 14. The VOIP component or VOIP application on the transceiver 126 also uses audio codecs to encode outgoing voice signals received from one or more of the client network nodes into IP packets that can be transmitted over an IP network as digital audio via an audio stream. The receiving gateway decompresses the IP packets and converts the decompressed IP packets into analog signals that are sent over the local PSTN network to the guest communicant's telephone 92.

In other embodiments, the communications application 128 on the transceiver 126 establishes an audio communication channel with a non-virtual-area-enabled communications application 94 executing on the guest network node 16. In these embodiments, the communications application 128 either has an integrated VOIP component or communicates with the programmatic interface of a separate VOIP application operating on the transceiver 126. The VOIP component or VOIP application on the transceiver 126 controls the set-up and tear-down of calls with the non-virtual-area-enabled communications application 94 in accordance with a session control protocol. The non-virtual-area-enabled communications application 94 operating on the guest network node 16 typically is a VOIP communications application that can communicate realtime audio data streams (and potentially other realtime data streams, e.g., video and chat realtime data streams) with the VOIP component or VOIP application operating on the transceiver 126.

In some embodiments, the guest node 16 includes a web browser application that includes a plugin other browser communication platform (e.g., a Java platform, a Flash platform, a Silverlight platform, or an HTML 5 platform) that allows for bi-direction UDP style port traffic for audio/video streams. In these embodiments, the browser communication platform implements a protocol stack similar to the protocol stack used in the communications applications 20, 22 to communicate with the network infrastructure service environment 30 in accordance with a native format and a communications protocol that facilitates realtime communications performance.

Figure 12:
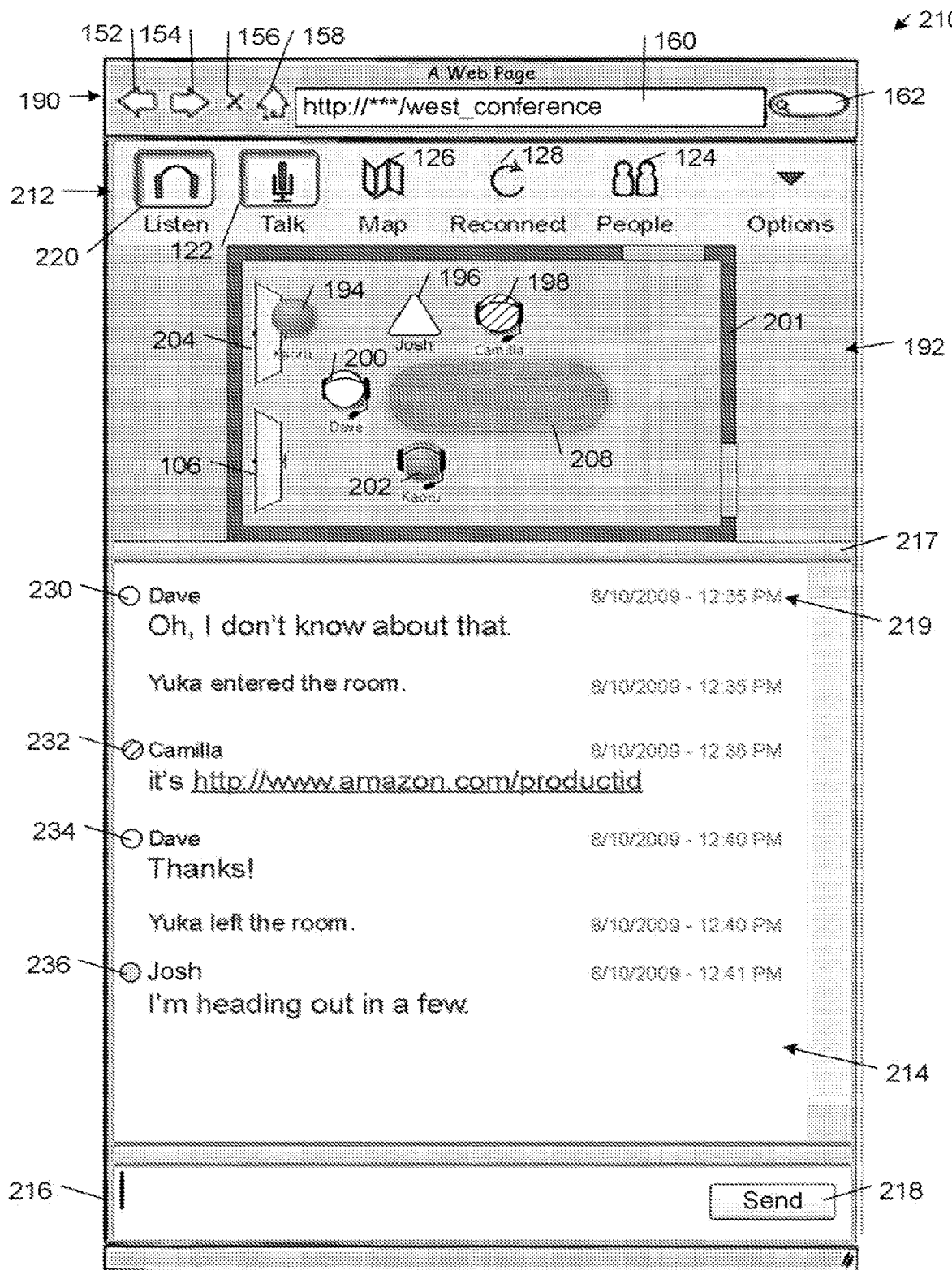
FIG. 12 is a diagrammatic view of an embodiment of a spatial communications interface.

3. Guest Communicant Visualization of a Spatial Communication Session in a Web Browser Window FIG. 12 shows an exemplary embodiment of a spatial interface 192 for a realtime chat interaction between a group of communicants in a virtual area that is generated by the web browser application 24 in a web browser window 210 on the guest network node 16. Each of the communicants is represented graphically by a respective sprite 194, 196, 198, 200, 202 and the virtual area is represented graphically by a two-dimensional top view of a rectangular space 201 (i.e., the "West Conference" space). When the communicants initially enter the virtual area, their sprites automatically are positioned in predetermined locations (or "seats") in the virtual area. The virtual area includes two viewscreen props 204, 206 and a table prop 208. The guest communicant interacts with the props by selecting them with an input device (e.g., by double-clicking on the props with a computer mouse, touch pad, touch screen, or the like).

The web browser window 210 includes a browser toolbar 150 that includes a set of web browsing navigation tools, including backward and forward buttons 152, 154, a stop button 156, a home button 158, an address bar 160, and a search box 162.

The web browser window 210 also integrates the spatial interface 192 with a spatial communications toolbar 212, a chat log area 214, a text box 216, and a Send button 218. The guest communicant may enter text messages in the text box 216 and transmit the text messages to the other communicants in the currently West Conference space 201 by selecting the Send button 218. The chat communications between the guest network node and the other client network nodes may be peer-to-peer or they may be mediated by a synchronous conferencing server of the virtual environment creator 18. The spatial interface 192 and the chat log area 214 are separated visually by a splitter 217 that, in some embodiments, can be slid up and down by the guest communicant to hide or reveal the spatial interface 192.

The chat log area 214 displays a log of current and optionally prior events that are associated with the West Conference space 201. An exemplary set of events that are displayed in the chat log area 214 include: text messages that the guest communicant has exchanged with other communicants in the West Conference space 201; changes in the presence status of communicants in the West Conference space 201; changes in the speaker and microphone settings of the communicants in the West Conference space 201; and the status of the props 204-208, including references to any applications and data files that are shared in connection with the props. In the illustrated embodiments, the events are labeled by the communicant's name followed by content associated with the event (e.g., a text message) or a description of the event. For example, in the example shown in FIG. 12, status related events are labeled as follows:

$UserName$ entered the room.
$UserName$ left the room.
$UserName$ shared $ProcessName$ on $ViewScreenName$.
$UserName$ cleared $ViewScreenName$ where the tags between "$" and "$" identify communicants, shared applications, or props. In addition, each of the events is associated with a respective timestamp 219 that identifies the date and time when the associated event was initiated.

In embodiments that are integrated with conventional instant messaging platforms (e.g., AOL Instant Messenger, MSN Messenger, Yahoo!Messenger, Google Talk, and Skype), the chat log area 214 typically contains a standard "chat history" (also referred to as an "instant message history") that includes a list of entries typed remotely by two or more networked communicants, interleaved in the order the entries have been typed. The chat history typically is displayed on each communicant's terminal display, along with an indication of which user made a particular entry and at what time relative to other communicant's entries. This provides a session history for the chat by enabling communicants to independently view the entries and the times at which each entry was made.

The spatial visualization 192 provides a context for organizing the presentation of the events that are displayed in the chat log area 214. For example, in the illustrated embodiment, each of the displayed events is labeled with a respective tag that visually correlates with the appearance of the sprite of the communicant that sourced the displayed event. In particular, each of the events that is sourced by a particular one of the communicants is labeled with a respective icon 230, 232, 234, 236 with a visual appearance (e.g., color-code) that matches the visual appearance of that communicant's sprite. In this example, the color of the icons 230, 234 matches the color of the body of Dave's sprite 200, the color of the icon 232 matches the color of the body of Camilla's sprite 198, and the color of the icon 236 matches the color of the body of Josh's sprite 196.

The spatial communications toolbar 212 includes a set of navigation and interaction control buttons, including a headphones button 220 for toggling on and off the guest communicant's speakers, a microphone button 222 for toggling on and off the guest communicant's microphone, a get button 124 for getting people, a map button 226 for opening a map view of a larger virtual area the contains the space 201, and a reconnect button 228 for reestablishing a connection to the virtual area.

After the user has moved into the West Conference space 201, the guest communicant is able to navigate around the virtual area and interact with objects in the virtual area subject to the capabilities specified by the sponsoring client network node 12. The guest communicant typically uses a computer mouse to navigate and interact with communicants and other objects in the virtual area. For example, the guest communicant may navigate to a location by selecting (e.g., double-clicking on) the particular location in the visualization of the virtual area. Similarly, the guest communicant may interact with objects (e.g., other communicants and props) in the virtual area by selecting (e.g., double-clicking on) the particular location of the object in the visualization of the virtual area.

In response to receipt of a particular request to move the graphical representation of the guest communicant from a current location in the virtual area to a new current location in the virtual area, the virtual area creator 18 determines the new current location of the graphical representation of the guest communicant in the virtual area based on the particular request. The interface specification typically includes respective specifications of one or more zones of the virtual area. As explained above, in some embodiments, each of the zones is addressed by a different respective universal resource locator (URL). In these embodiments, the selection of a particular zone in the virtual area is reported to the virtual environment creator 18 in a message that contains the URL of the selected zone. The virtual environment creator determines that guest communicant wishes to enter the zone that is addressed by the URL in the message. The virtual environment creator 18 responds to the message based on properties of the zone that is addressed by the respective URL referenced by the message. For example, the virtual environment creator 18 may move the guest communicant into the selected zone if the guest communicant's capabilities allow such a move; otherwise, the virtual environment creator 18 may not allow the guest communicant to move into the selected zone. If the guest communicant is permitted to move, the virtual environment creator 18 updates the interface specification to include the graphical representation of the guest communicant moved to the new current location and sends the updated interface specification to the browser application 24. The virtual environment creator 18 also transmits to each of the client network nodes a respective specification of the graphical representation of the guest communicant and its respective current location in the virtual area in association with a unique guest identifier of the guest communicant. The guest identifier is associated with a realtime communication channel established between the guest network node and one or more of the client network nodes. This allows each of the client network nodes 12, 14 to match the guest communicant's avatar to the state of the communicant that is inferred by the communications applications 20, 22 from the identically labeled realtime communication channel.

The guest communicant may toggle one or both of the headphones button 220 and the microphone button 222 in order to selectively turn-on and turn-off one or both of the guest communicant's speakers and microphone. In some embodiments, the toolbar buttons 220, 222 control the local audio settings on the guest network node 16 such that audio signals sent to and from the local sound card are enabled or disabled. In this way, the guest communicant's audio communications through a non-virtual-area-enabled communications application (e.g., application 94 shown in FIGS. 4 and 6) can be controlled through a client-side script in the web browser application. In other embodiments, changes in the state of the toolbar buttons 220, 222 are detected by an event handler, which triggers a browser script to report the change to the virtual environment creator 18. In response, the virtual environment creator 18 transmits audio control messages to the instances of the virtual-area-enabled communications applications 20, 22 operating on the client network nodes 12, 14. The audio control messages cause the virtual-area-enabled communications applications 20, 22 to change the states of the guest communicant's speaker and microphone channels to conform to the states of the corresponding toolbar buttons 220, 222.

Figure 13:
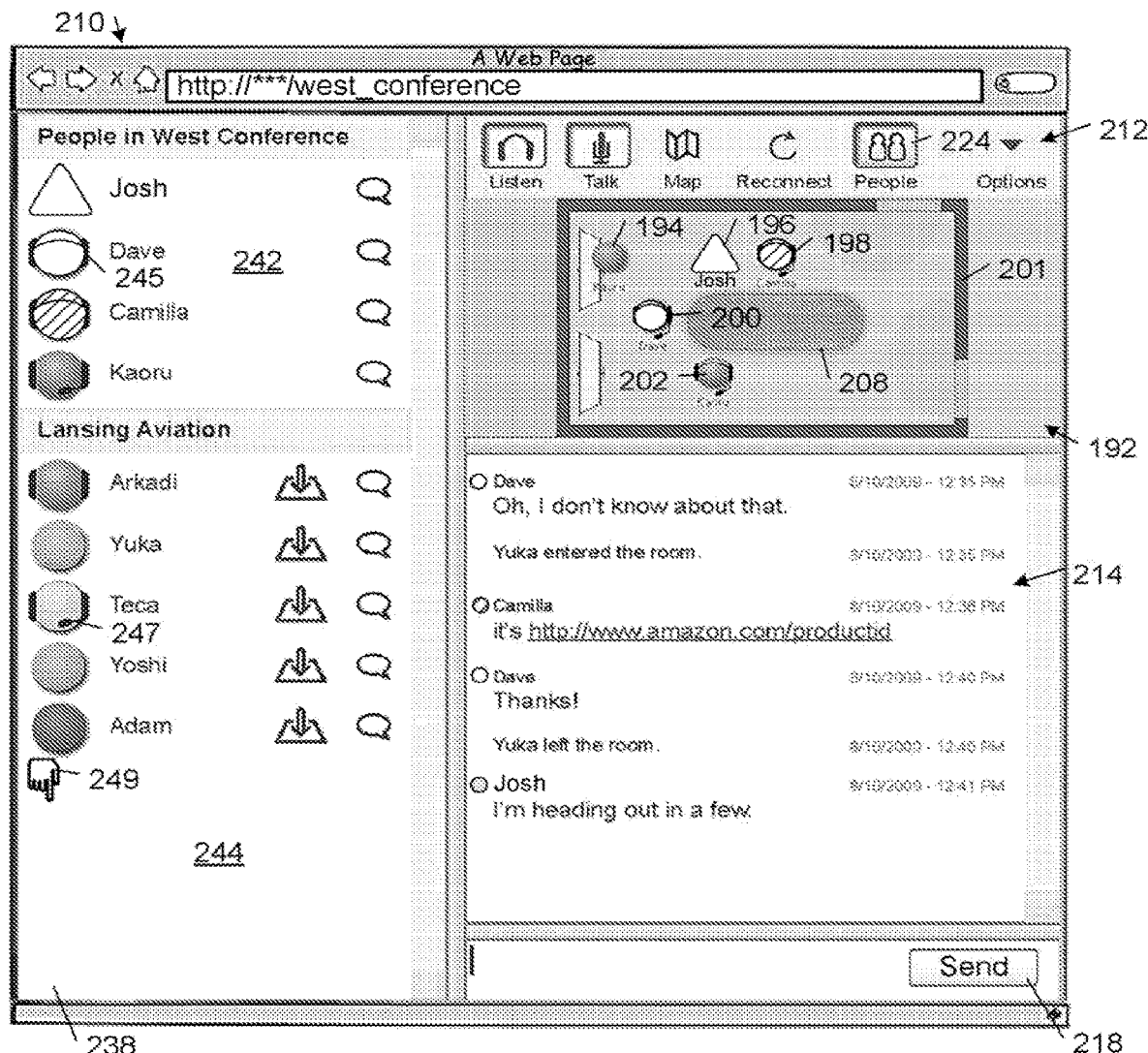
FIG. 13 is a diagrammatic view of an embodiment of a spatial communications interface.

Referring to FIG. 13, in response to a guest communicant's selection of the get button 224, a list of communicants is displayed in a separate frame 238. The communicants are segmented into two groups: a first group labeled "People in West Conference" that identifies all the communicants who are in the current area (i.e., West Conference); and a second group labeled "Lansing Aviation" that identifies all the communicants who are present in a larger area (i.e., Lansing Aviation, which contains the current area) but are not present in the current area. Each of the virtual areas is represented by a respective one-dimensional space 242, 244 that contains graphical representations of the communicants who currently have presence in the space. In some embodiments, the ordering of the spatial positions (e.g., from top to bottom) of the graphical representations of the communicants in each of the virtual areas 242, 244 corresponds to a spatial visualization of the temporal ordering of the communicants in terms of the times when they established respective presences in the virtual areas. In the illustrated embodiments, each communicant is represented by a respective circular sprite that is labeled with a respective user name of the communicant (i.e., "Josh," "Dave," "Camilla," "Karou," "Arkadi," "Yuka," "Teca," "Yoshi," and "Adam").

The states of various communication channels over which the respective communicant is configured to communicate are revealed by visual cues that are shown in the spatial visualizations of the communicants in the virtual areas 242, 244.

For example, the virtual environment creator 18 updates the visualization of the communication session to reflect the current audio states of the communicants in the virtual area. In response to a command from a given one of the client communicants to activate an audio sink communication channel, the virtual area creator 18 incorporates in the interface specification a specification for depicting the graphical representation of the given communicant with a visual indication that the given communicant is configured as an audio sink. In response to a command from a given one of the client communicants to activate an audio source communication channel, the virtual area creator 18 incorporates in the interface specification a specification for depicting the graphical representation of the given client communicant in the virtual area with a visual indication that the given communicant is configured as an audio source. In response to receipt of a particular request to change the state of a guest audio communication channel over which the guest communicant is registered to communicate, the virtual environment creator transmits to each of the client network nodes a respective specification for depicting a graphical representation of the guest communicant in the virtual area with a visual indication of the changed state of the guest audio communication channel.

In some embodiments, the on or off state of a communicant's local speaker channel is depicted by the presence or absence of a headphones graphic 245 on the communicant's sprite. Thus, when the speakers of the communicant who is represented by the sprite are on, the headphones graphic 245 is present (see sprites Josh, Dave, Camilla, Karou, Arkadi, and Teca) and, when the communicant's speakers are off, the headphones graphic 245 is absent (see sprites Yuka, Yoshi, and Adam). The on or off state of the communicant's microphone is depicted by the presence or absence of a microphone graphic 247 on the communicant's sprite. Thus, when the microphone is on, the microphone graphic 247 is present (see sprites Karou and Teca) and, when the microphone is off, the microphone graphic 247 is absent (see sprites Josh, Dave, Camilla, Arkadi, Yuka, Yoshi, and Adam). The headphones graphic 245 and the microphone graphic 247 provide visual cues of the states of the communicant's sound playback and microphone devices. Additional visual cues showing the audio communication states of the communicants also may be provided. For example, in some embodiments, radiating circles are shown around a communicant's sprite when that communicant is talking in order to indicate the on state of a communicant's microphone graphic.

The activity state of a communicant's text chat channel is depicted by the presence or absence of the hand graphic 249 adjacent the communicant's sprite (see sprite Adam). Thus, when a communicant is transmitting text chat data to another network node the hand graphic 249 is present, and when a communicant is not transmitting text chat data the hand graphic 249 is not present. In some embodiments, text chat data is transmitted only when keyboard keys are depressed, in which case the visualization of the communicant's text channel appears as a flashing on and off of the hand graphic 249.

Figure 14:
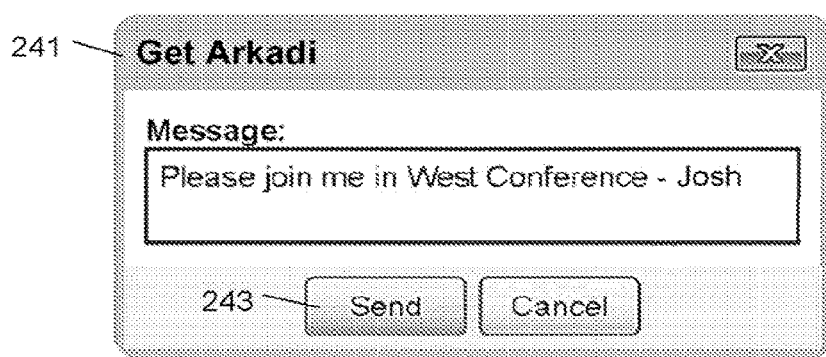
FIG. 14 is a diagrammatic view of an embodiment of a pop-up browser window that is associated with the spatial communications interface of FIG. 13.

In response to a guest communicant selection of one of the communicants in the list of available communicants in the browser frame 238 (see FIG. 13), the platform transmits an invitation to the selected communicant to join the guest communicant in the respective zone. For example, FIG. 14 shows a pop-up browser window 241 that is generated by the platform in the situation in which the guest communicant has selected "Arkadi" in the list of available communicants displayed in the frame 238. In response to the selection of the Send button 143, the platform transmits an invitation to the communicant who is associated with the name Arkadi to join the guest communicant in the West Conference space 201 (e.g., "Please join me in West Conference—Josh.").

In some embodiments, the interface specification includes one or more props. Each of the props typically represents a respective communication channel for communications between the client and guest network nodes. Each of the props typically is addressable by a different respective universal resource locator (URL). In response to receipt of a particular message from the web browser application 24 referencing a respective one of the URLs, the virtual environment creator 18 responds to the particular message based on properties of the prop that is addressable by the respective URL referenced by the particular command.

For example, in response to receiving from the web browser application a particular message corresponding to a selection of a viewscreen prop in the virtual area, the virtual environment creator 18 may initiate an application sharing session between the guest network node and each of the client network nodes present in the virtual area. In some embodiments, the virtual environment creator 18 serves to the web browser application the URL of a separate video stream that corresponds to the application sharing session, which typically is captured by a transceiver or other central node. The video stream typically is encoded and served to the web browser application via HTTP streaming. The web browser application may embed the video stream in the HTML document showing the virtual are and render the video stream using, for example, a standard video display technology, such as a video plugin, an HTML5 video tag, or Flash player.

In some embodiments, the viewscreen prop provides visual cues that indicate whether or not a communicant is sharing an application over an application sharing channel. In response to the guest communicant's selection of the viewscreen prop, the guest communicant's sprite automatically is moved to a position in the graphical representation of the virtual area that is adjacent the viewscreen prop. The position of the guest communicant's sprite adjacent the viewscreen prop indicates that the communicant currently is sharing or is about to share an application with the other communicants in the virtual area. The graphical depiction of viewscreen prop is changed depending on whether or not an active application sharing session is occurring. For example, the depicted color of the viewscreen may change from light during an active application sharing session to dark when there is no application sharing taking place. Additional details regarding the application sharing process are described in connection with FIGS. 26-28 of U.S. patent application Ser. No. 12/354,709, filed Jan. 15, 2009, and in U.S. patent application Ser. No. 12/418,270, filed Apr. 3, 2009.

In response to receiving from the web browser application a particular request corresponding to a selection of a table prop in the virtual area, the virtual environment creator 18 may initiate a file sharing session between the guest network node and each of the client network nodes present in the virtual area. In some embodiments, the table prop provides visual cues that indicate whether or not a communicant is sharing or has shared a data file over a data file sharing channel. For example, in response to the guest communicant's selection of the table prop, the guest communicant's sprite automatically is moved to a position in the graphical representation of the virtual area that is adjacent the table. The position of the guest communicant's sprite adjacent the table prop indicates that the guest communicant currently is sharing or is about to share a data file with the other communicants in the virtual area. In this process, the guest communicant uploads the data file from the guest network node 16 to a repository that is maintained by the virtual environment creator 18. In response to the guest communicant's selection of the data file to upload, the virtual environment creator 18 stores the uploaded file in the repository and creates a database record that associates the data file with the table prop. After a data file has been shared by the guest communicant, the state of the table prop changes from having a clear table surface to having a graphical representation of a data file on the table surface. Other communicants in the virtual area are able to view the contents of the uploaded data file by selecting the graphical representation of the data file and, subject to governance rules associated with the virtual area, optionally may be able to modify or delete the data file. Additional details regarding the file sharing process are described in connection with FIGS. 22 and 23 of U.S. patent application Ser. No. 12/354,709, filed Jan. 15, 2009.

In some embodiments, a call-in number (e.g., a phone number or unique VOIP ID, such as a Skype ID) that allows the guest communicant to initiate a VOIP call directly into the audio zone/channel may be associated with an area, a room, or a prop within an area or room. When connected, the guest communicant may be represented graphically by an avatar with presence in the area, room or prop, or by another representation that matches the type of connection (e.g., a mobile telephone when the guest communicant is calling in using his or her mobile telephone). In some embodiments, a permission check is asserted to determine if the guest node that initiated the call has access to the resources inside the zone associated with the call-in number. These embodiments enable the guest communicant to initiate communications directly with someone inside the virtual area or enable a communicant using a respective one of the communication applications 20, 22 to access the area. These embodiments may provide particular utility for enabling retrieval and auditory consumption of stored information, files, or audio in the call-in zone, as well as enabling access to communicate with the other client nodes in the zone.

IV. EXEMPLARY OPERATING ENVIRONMENT

Communicants typically access a shared virtual area communication environment from respective network nodes. Each of these network nodes typically is implemented by a general-purpose computer system or a dedicated communications computer system (or "console"). Each network node executes communications processes that present a respective view of the virtual area at each network node and establish real-time data stream connections with other network nodes.

Figure 15:
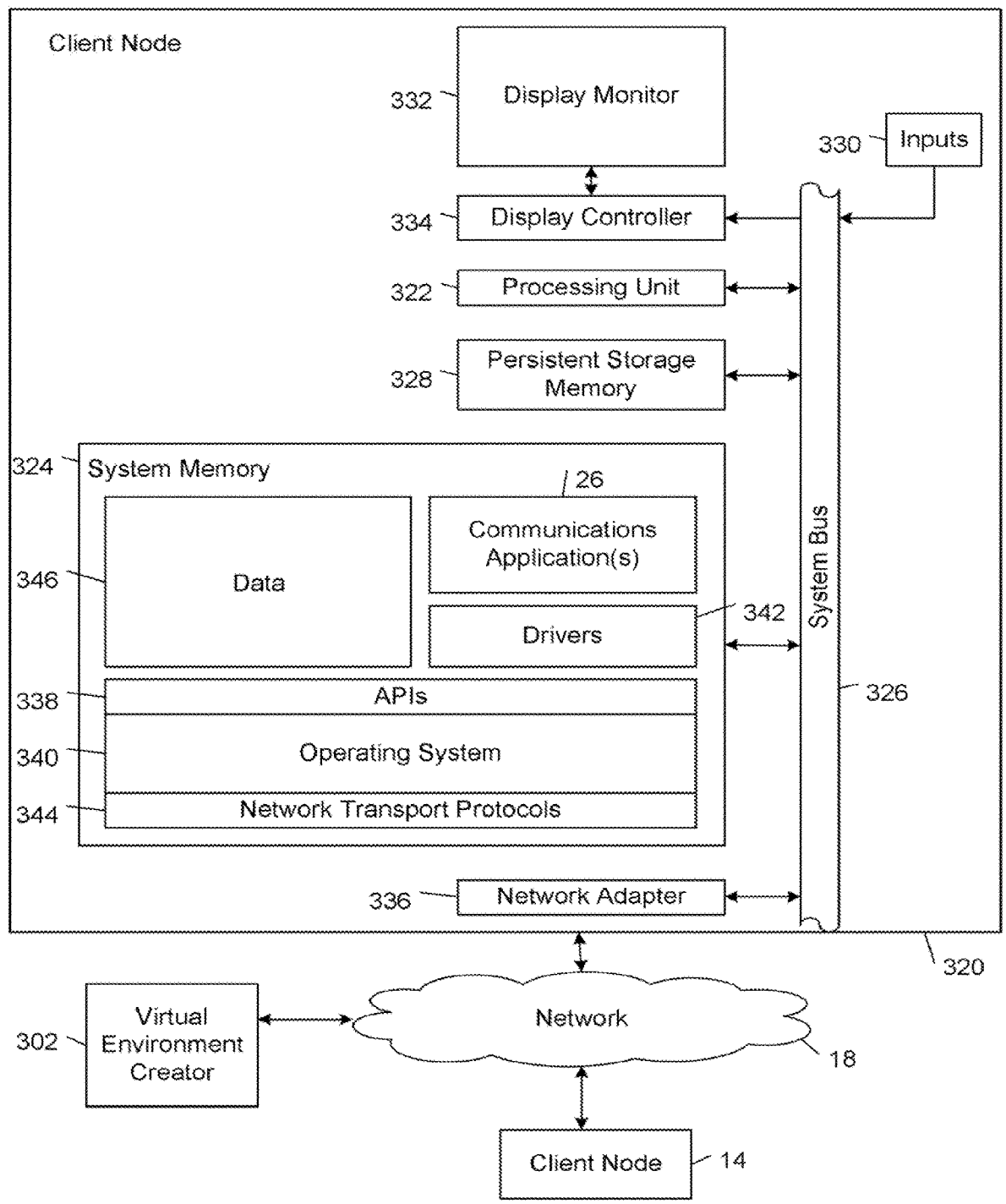
FIG. 15 is a block diagram of an embodiment of a network node.

FIG. 15 shows an exemplary embodiment of a client network node that is implemented by a computer system 320. The computer system 320 includes a processing unit 322, a system memory 324, and a system bus 326 that couples the processing unit 322 to the various components of the computer system 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer system 320, and a random access memory (RAM). The system bus 326 may be a memory bus, a peripheral bus or a local bus, and may be compatible with any of a variety of bus protocols, including PCI, VESA, Microchannel, ISA, and EISA. The computer system 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A communicant may interact (e.g., input commands or data) with the computer system 320 using one or more input devices 330 (e.g. one or more keyboards, computer mice, microphones, cameras, joysticks, physical motion sensors such Wii input devices, and touch pads). Information may be presented through a graphical user interface (GUI) that is presented to the communicant on a display monitor 332, which is controlled by a display controller 334. The computer system 320 also may include other input/output hardware (e.g., peripheral output devices, such as speakers and a printer). The computer system 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows XP® operating system available from Microsoft Corporation of Redmond, Washington U.S.A.), the communications application 26, drivers 342 (e.g., a GUI driver), network transport protocols 344, and data 346 (e.g., input data, output data, program data, a registry, and configuration settings).

In some embodiments, the one or more server network nodes of the virtual environment creator 18 are implemented by respective general-purpose computer systems of the same type as the client network node 320, except that each server network node typically includes one or more server software applications.

In other embodiments, the one or more server network nodes of the virtual environment creator 18 are implemented by respective network devices that perform edge services (e.g., routing and switching).

V. CONCLUSION

The embodiments that are described herein provide improved systems and methods for visualizing realtime network communications. In particular, these embodiments provide a web browser interface for spatial communication environments.

This feature allows communicants to interact with other communicants in an immersive spatial communication environment without having to install any specialized communication software and without requiring special proxies or firewall additions or exceptions.

Other embodiments are within the scope of the claims.

The invention claimed is:

1. An apparatus comprising:
a computer system comprising:
one or more processors included in a computer system; and
a memory, coupled to the one or more processors, storing code, wherein execution of the code by the one or more processors causes the computer system to perform operations comprising:
managing a realtime communication session between client communicants operating respective client network nodes each of which is executing a respective realtime communications application that administers the realtime communication session through integration of functionality for (i) exchanging peer-to-peer realtime data streams in association with functionality for (ii) rendering a spatial visualization comprising a respective visual graphical representation of each of the client communicants in a visual area, determining respective locations of the visual representations of the client communicants in the visual area, and managing realtime communications between the client communicants based on the determined locations of their respective visual representations in the visual area; and
through a web browser application, interfacing a guest communicant with the realtime communication session, wherein the guest communicant operating the web browser application on a guest network node with the realtime communication session, wherein the interfacing comprises establishing a presence for the guest communicant in a respective location in the visual area, transmitting to the guest network node an interface specification comprising specifications of the visual representation of the visual area and the visual representations of the guest communicant and the client communicants and their respective current locations in the visual area, and responding to messages received from the web browser application in connection with respective elements of the interface specification;

wherein the interface specification transmitted to the guest network node comprises specifications for depicting cues indicating respective current communication states of communication channels respectively allocated for carrying realtime data streams communicated by the network nodes of the client communicants in the visual area independent of any communications received by the guest network node on the communication channels, and the visual presentations change dynamically to reflect current realtime data stream activities on the respective communication channels over which respective ones of the client network nodes are configured to communicate.

2. The apparatus of claim 1, wherein the interfacing comprises sending to the guest network node a rendering engine that is executable by the web browser and is operable to translate the interface specification into a format that is interpretable by the web browser application.

3. The apparatus of claim 2, wherein the transmitting comprises transmitting the interface specification to the web browser application in an extended markup language (XML) format, and the rendering engine is operable to translate the interface specification from the XML format to a hyper text markup language (HTML) interface specification and to render the HTML specification in a web browser frame.

4. The apparatus of claim 1, wherein the interface specification comprises respective specifications of one or more zones of the visual area, each of the zones is addressed by a different respective universal resource locator (URL), and the responding comprises responding to a particular message from the web browser application referencing a respective one of the URLs based on properties of the zone that is addressed by the respective URL referenced by the particular message.

5. The apparatus of claim 1, wherein execution of the code by the one or more processors causes the computer system to perform operations further comprising:

in response to a message from a given one of the client communicants to activate an audio sink communication channel, incorporating in the interface specification a specification for depicting the visual representation of the given communicant with a visual indication that the given communicant is configured as an audio sink.

6. The apparatus of claim 1, wherein execution of the code by the one or more processors causes the computer system to perform operations further comprising:

in response to a message from a given one of the client communicants to activate an audio source communication channel, incorporating in the interface specification a specification for depicting the visual representation of the given client communicant in the visual area with a visual indication that the given communicant is configured as an audio source.

7. The apparatus of claim 1, wherein execution of the code by the one or more processors causes the computer system to perform operations further comprising:

receiving from the web browser application a particular message to change the state of a guest audio communication channel over which the guest communicant is registered to communicate; and in response to the particular message, transmitting to each of the client network nodes a respective specification for depicting a visual representation of the guest communicant in the visual area with a visual indication of the changed state of the guest audio communication channel.

8. The method apparatus of claim 7 wherein execution of the code by the one or more processors causes the computer system to perform operations further comprising:

receiving from the web browser application a particular message to move the visual representation of the guest communicant from a current location in the visual area to a new current location in the visual area;

determining the new current location of the visual representation of the guest communicant in the visual area based on the particular message; and sending updates to the browser application, wherein the updates comprise modifications to the interface specification that reflect the visual representation of the guest communicant moved to the new current location.

9. The apparatus of claim 8, wherein execution of the code by the one or more processors causes the computer system to perform operations further comprising:

transmitting to each of the client network nodes a respective specification of the visual representation of the guest communicant and its respective current location in the visual area in association with a unique guest identifier of the guest communicant, wherein the guest identifier is associated with a realtime communication channel established between the guest network node and one or more of the client network nodes.

10. The apparatus of claim 1, wherein the interface specification comprises one or more props, each of the props represents a respective communication channel for communications between the client and guest network nodes, each of the props is addressable by a different respective universal resource locator (URL), and in response to receipt of a particular message from the web browser application referencing a respective one of the URLs, the responding comprises responding to the particular message based on properties of the prop that is addressable by the respective URL referenced by the particular message.

11. The apparatus of claim 1, wherein execution of the code by the one or more processors causes the computer system to perform operations further comprising:

in response to receiving from the web browser application a particular message corresponding to a selection of a viewscreen prop in the visual area, administering an application sharing session between the guest network node and each of the client network nodes present in the visual area, wherein the administering comprises capturing a video stream of the application sharing session and supplying the video stream to the given network node for rendering by the web browser application.

12. The apparatus of claim 1, wherein execution of the code by the one or more processors causes the computer system to perform operations further comprising in response to receiving from the web browser application a particular message corresponding to a selection of a table prop in the visual area, initiating a file sharing session between the guest network node and each of the client network nodes present in the visual area.

13. The apparatus of claim 1, wherein execution of the code by the one or more processors causes the computer system to perform operations further comprising:

registering the guest communicant with a unique guest identifier that is associated with a realtime communication channel between the guest network node and one or more of the client network nodes, wherein the managing comprises transmitting to each of the client network nodes a respective specification of a visual representation of the guest communicant and its respective current location in the visual area in association with the guest identifier.

14. The apparatus of claim 1, wherein the interface specification comprises a specification of a presentation of navigation controls that enable the guest communicant to specify where to establish a presence in the visual area.

15. The apparatus of claim 1, wherein the interface specification comprises a specification of a presentation of interaction controls that enable the guest communicant to manage interactions with one or more of the client communicants in the network communication environment.

16. The apparatus of claim 1, wherein the interface specification comprises a specification of a presentation of a log of event descriptions describing respective events involving interactions of the communicants in the visual area.

17. The apparatus of claim 1, wherein messages are received from the web browser application and responses are sent to the web browser application in accordance with the hypertext transport protocol.

* * * * *